United States Patent
Pankratius

(10) Patent No.: US 12,359,471 B2
(45) Date of Patent: Jul. 15, 2025

(54) CHAIN LOCK AND CHAIN FOR A CHAIN LOCK

(71) Applicant: ABUS August Bremicker Söhne KG, Wetter-Volmarstein (DE)

(72) Inventor: Ernst Pankratius, Wetter (DE)

(73) Assignee: ABUS August Bremicker Söhne KG, Wetter-Volmarstein (DE)

( * ) Notice: Subject to any disclaimer, the term of this patent is extended or adjusted under 35 U.S.C. 154(b) by 102 days.

(21) Appl. No.: 18/038,761

(22) PCT Filed: Nov. 12, 2021

(86) PCT No.: PCT/EP2021/081481
§ 371 (c)(1),
(2) Date: May 25, 2023

(87) PCT Pub. No.: WO2022/112019
PCT Pub. Date: Jun. 2, 2022

(65) Prior Publication Data
US 2023/0417082 A1    Dec. 28, 2023

(30) Foreign Application Priority Data
Nov. 26, 2020  (DE) .................. 10 2020 131 332.2

(51) Int. Cl.
*E05B 71/00* (2006.01)
*F16G 13/18* (2006.01)

(52) U.S. Cl.
CPC .............. *E05B 71/00* (2013.01); *F16G 13/18* (2013.01)

(58) Field of Classification Search
CPC .... E05B 67/003; E05B 71/00; E05B 73/0005; F16G 13/18; Y10T 70/5872
(Continued)

(56) References Cited

U.S. PATENT DOCUMENTS 507,948 A * 10/1893 Waine ................... E05B 67/003
                                                          70/49
1,069,646 A * 8/1913 Richter ................. E05B 67/003
                                                          70/49
(Continued)

FOREIGN PATENT DOCUMENTS

CN    209413545 U    9/2019
DE      1789133 U    5/1959
(Continued)

OTHER PUBLICATIONS

"Master Lock Cuff Lock" (https://www.scooter-center.com/en/double-lock-chain-combo-handcuffs-master-lock-cuff-lock-security-level-9-55cm-3331847) 1 page.

*Primary Examiner* — Suzanne L Barrett
(74) *Attorney, Agent, or Firm* — Dickinson Wright PLLC

(57) ABSTRACT

A chain lock comprises a lock body and a chain lockable to the lock body. This chain comprises a serial arrangement of consecutive links coupled to one another via a respective articulated joint and pivotable relative to one another about a joint axis, which is parallel to a normal direction, of the respective articulated joint. The arrangement is foldable into a compact storage configuration in which, at each of the articulated joints, the links coupled to one another via the respective articulated joint are pivoted relative to one another about the joint axis of the respective articulated joint such that they enclose the smallest possible angle of their relative pivotability. A pulling device extends along said arrangement, by way of which a first end of the arrangement and a second end of the arrangement opposite thereto are pullable toward one another to bring the arrangement into the compact storage configuration.

20 Claims, 7 Drawing Sheets

(58) Field of Classification Search
USPC .......................................................... 70/233
See application file for complete search history.

(56) References Cited

U.S. PATENT DOCUMENTS

| | | | | |
|---|---|---|---|---|
| 4,494,391 A * | 1/1985 | Solow | .................... | B60R 25/023 |
| | | | | 70/237 |
| 4,524,591 A * | 6/1985 | Lanka | .................... | E05B 67/22 |
| | | | | 70/39 |
| 4,860,408 A | 8/1989 | Johnson | | |
| 4,878,345 A | 11/1989 | Bechtold | | |
| 4,885,907 A * | 12/1989 | Pappanikolaou | ....... | F16G 13/18 |
| | | | | 59/84 |
| 5,475,993 A * | 12/1995 | Kuo | .................... | E05B 71/00 |
| | | | | 70/53 |
| 6,050,587 A | 4/2000 | Panhausen | | |
| 11,293,201 B2 * | 4/2022 | Weng | .................... | E05B 71/00 |
| 2002/0108406 A1 | 8/2002 | Makos et al. | | |
| 2012/0151973 A1 * | 6/2012 | Cheung | .................... | E05B 67/003 |
| | | | | 70/53 |
| 2017/0051537 A1 * | 2/2017 | Wang | .................... | E05B 37/025 |
| 2017/0089100 A1 * | 3/2017 | Wang | .................... | E05B 73/0005 |

FOREIGN PATENT DOCUMENTS

| | | | | |
|---|---|---|---|---|
| DE | 4341622 A1 * | 6/1995 | ............ | B62H 5/003 |
| DE | 202019105721 U1 | 10/2019 | | |
| EP | 0794111 A1 * | 9/1997 | | |
| EP | 2799738 B1 * | 8/2015 | ............ | F16G 13/06 |
| JP | H0626258 A * | 2/1994 | | |
| JP | 2007051493 A | 3/2007 | | |
| KR | 20130010656 A * | 1/2013 | | |
| WO | 2011128523 A1 | 10/2011 | | |
| WO | WO-2017182979 A1 * | 10/2017 | ............ | B62H 5/00 |
| WO | WO-2020055891 A1 * | 3/2020 | ............ | B62H 5/14 |

* cited by examiner

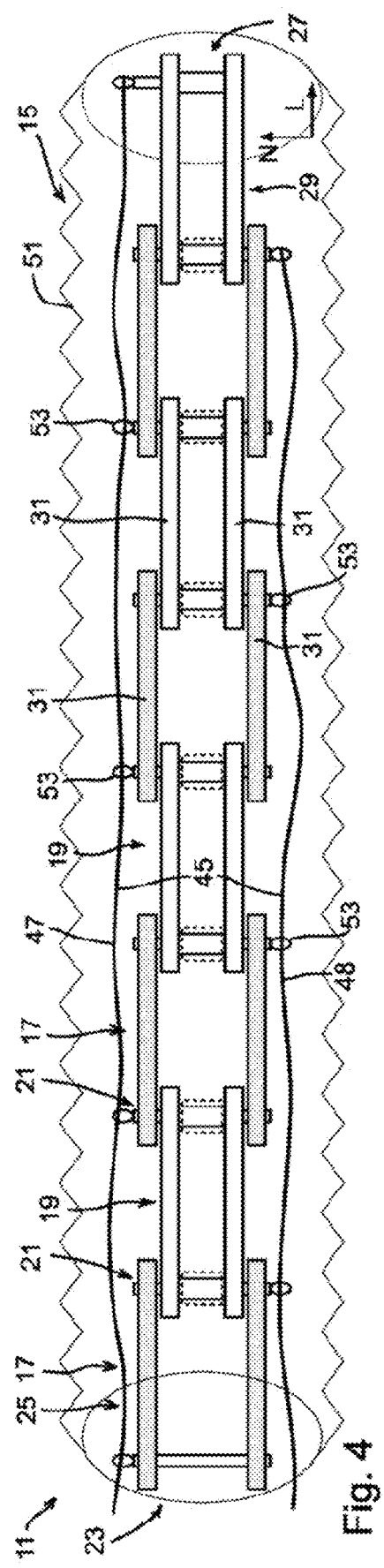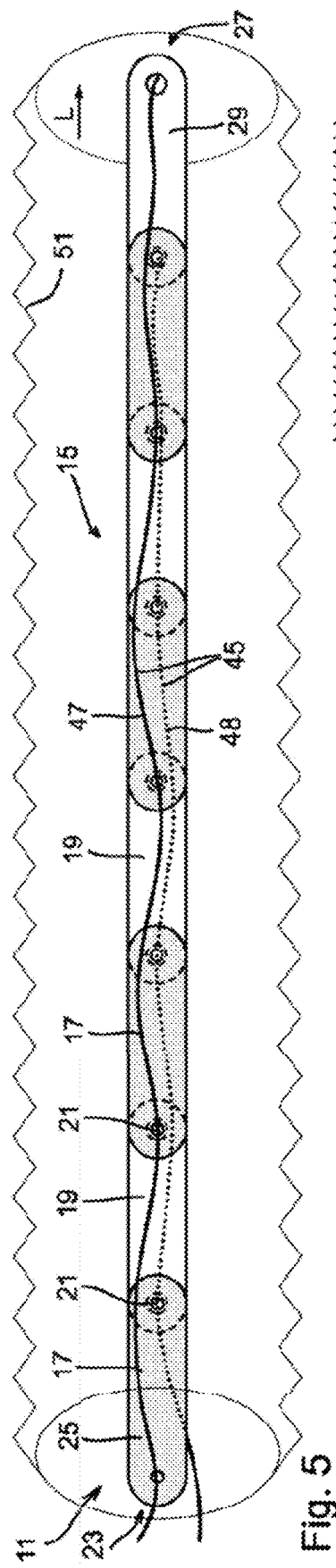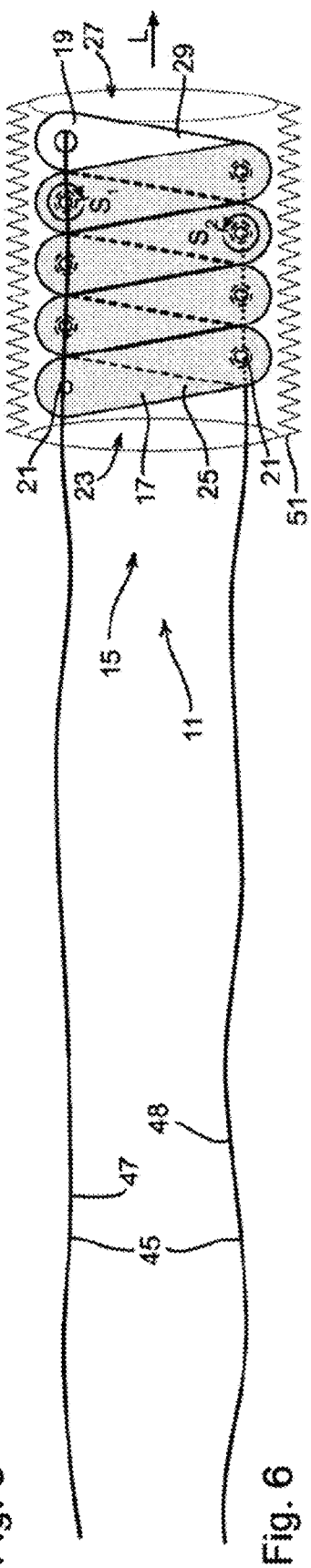

CHAIN LOCK AND CHAIN FOR A CHAIN LOCK

FIELD

The present disclosure relates to a chain lock, in particular to a two-wheeler chain lock, and to a chain for a chain lock, in particular for a two-wheeler chain lock.

BACKGROUND

To secure two-wheelers or other movable objects against theft, it is known to connect the respective object to an immovable object by way of a lock. In this respect, the lock generally has an elongate latch element which is ideally guided through an opening of the object to be secured and through an opening of the immovable object or around the immovable object and is then received at and locked to a lock body of the lock such that a structure results that is closed in a ring shape and that can subsequently be unlocked and opened again in a regular manner only by way of an associated secret code, for example, a key or a code.

This latch element may, for example, be a typically U-shaped closing hoop of a hoop lock. Such a closing hoop is rigid. For this reason, it may only have a very limited length in order not to be too bulky for a simple transport. This has the result that the movable object to be secured has to be positioned very close to the immovable object to which it is to be secured in order to be able to be secured thereto by way of a hoop lock.

A more flexible positioning of the object to be secured may be achieved by a lock having a longer latch element that is then, however, preferably not rigid or at least not rigid throughout, but may be folded to be able to be transported in a compact shape. Such a latch element may, for example, be formed by a rope, a cable, or a chain.

In addition to a flexible applicability, it is in this respect naturally also important that the latch element is designed as secure as possible against a separation or a breaking open. Cable locks, in particular spiral cable locks, may indeed have particularly long latch elements that may e.g. be formed from wire ropes, but that often do not offer a particularly high level of security. In comparison thereto, the use of a link chain comprising round or oval chain links engaging into one another as the latch element may offer a higher security because the link chain as a whole is indeed flexible, but the individual chain links may be rigid and may thus be formed from a particularly hard material, e.g. from a hardened steel. However, the comparatively high weight may be a disadvantage of a link chain as the latch element.

The weight may play a rather minor role for the securing of heavy motorcycles. However, especially with bicycles, in particular e.g. high-quality lightweight racing bikes, a low weight is also important in addition to a high security against being broken open. In particular in this connection, jointed bar locks are particularly advantageous whose latch element is formed by rigid flat-elongate links that are coupled to one another in an articulated manner and that are arranged offset in parallel from one another such that they may be folded in the manner of a yardstick to form a compact package. These rigid jointed bars as well as the articulated joints between the jointed bars may in this respect offer a high security against being broken open while the weight remains comparatively low. In addition, a jointed bar lock may indeed have a long length, in particular in comparison with a hoop lock, but may nevertheless be folded in a particularly compact manner and may thus be easily transportable.

However, to be able to be easily folded like a yardstick with a few hand movements, the length of the individual jointed bars may not be too short and the number of jointed bars may not be too high. This has the result that the jointed bar arrangement may only have a polygonal course of a few straight sections, but may not be led around tight curves. In particular in confined environments, e.g. when a plurality of bicycles are connected to a single lamppost, it is, however, advantageous if the latch element of the respective lock may also have tightly curved courses in order to be particularly flexibly usable.

SUMMARY

It is an object of the present disclosure to provide a chain lock, in particular a two-wheeler chain lock, and a chain for a chain lock, in particular for a two-wheeler chain lock, that may each be used in a particularly flexible manner, that may be simply folded in a compact manner for transport, and that in this respect simultaneously have a high security against being broken open and a comparatively low weight.

The object is satisfied by a chain lock and by a chain according to one or more aspects set forth in the present disclosure.

Advantageous embodiments of the present disclosure result from the present description, and from the Figures.

The chain in accordance with the present disclosure is configured for a chain lock, in particular for a two-wheeler chain lock, such that it is in particular suitable to be used as the latch element of a chain lock. For this purpose, the chain may be correspondingly configured, in particular at its respective ends or at least one of the ends, for example by providing one or more elements of a locking mechanism or one or more elements cooperating with a locking mechanism, e.g. a bolt, there. However, this is not absolutely necessary. For provision may also be made that certain sections of the chain that are not necessarily configured in a particular manner for a locking may be locked to a lock body of the chain lock. For this purpose, the lock body may, for example, have a locking receiver in which a respective one of these sections may be received and may then be secured against a departure from the locking receiver by way of the locking mechanism that is in particular formed at the lock body.

In accordance with the present disclosure, the chain comprises a serial arrangement of consecutive links, wherein the links are coupled to one another via a respective articulated joint between one another and may be pivoted relative to one another about a joint axis, which is parallel to a normal direction, of the respective articulated joint, i.e. the links of each pair of two directly consecutive links of the arrangement are coupled to one another via a respective articulated joint and are pivotable relative to one another about a joint axis, which is parallel to a normal direction, of the respective articulated joint.

The serial arrangement therefore comprises a plurality of links that are arranged in a specific sequence. The arrangement may in particular extend from a first end link up to a second end link. Each link of the arrangement, with the exception of the two end links, is in each case coupled to the link preceding it along the sequence and to the link following it along the sequence via a respective articulated joint. The first end link, which is not preceded by a link along the sequence, may in this respect be coupled only to the link of the arrangement which follows it along the sequence and the second end link, which is not followed by a link along the sequence, may in this respect be coupled, via an articulated joint, only to the link of the arrangement which precedes it along the sequence. In general, however, even further elements of the chain, in particular also further links, may be connected to one or to both ends of the arrangement and may be coupled in an articulated manner or in another manner to the respective end. The arrangement, for example, comprises at least four links, preferably at least ten links, in particular at least 16 links.

All the articulated joints, which each couple two consecutive links of the arrangement, each have a joint axis about which the links coupled by the respective articulated joint are pivotable relative to one another. All these joint axes are in this respect aligned parallel to a normal direction and are thus also aligned parallel to one another. The designation of the common orientation of the joint axes as a normal direction in this respect only serves for the conceptual differentiation from other directions and is not intended to imply that either a restriction to a particular spatial direction or a particular property of the direction is "normal".

The articulated joints are in particular each configured such that the two links coupled by the respective articulated joint are pivotable relative to one another only about said joint axis of the articulated joint and have no other kind of relative movability. In other words, apart from a possible and generally not completely avoidable clearance, e.g. an offset along the joint axis and smaller tilting movements perpendicular to the joint axis, the articulated joints each have only one degree of freedom, namely the pivotability about the joint axis. Because all the links are thus pivotable about mutually parallel joint axes, the movability of the links, and thus of the total mentioned arrangement, may overall be limited to movements within a spatial region that is bounded by two planes perpendicular to the normal direction.

The links of the arrangement may each extend along a longitudinal extent from a first end to a second end of the respective link. In this respect, the articulated joint for coupling to the respective preceding link, if such a one is present, may in particular be provided at the first end of a respective link and the articulated joint for coupling to the respective following link, if such a one is present, may be provided at the second end of a respective link. The direction of the longitudinal extent of the respective link may then be defined by a straight line that connects the two articulated joints, in particular perpendicular to the normal direction. The longitudinal extent of a respective link may, for example, amount to some few centimeters, e.g. be in a range between 2 cm and 10 cm, preferably in a range between 3 cm and 8 cm, in particular in a range between 4 cm and 6 cm.

The links of the arrangement may generally be of the same construction as one another or may also be formed differently from one another. It is in particular also possible for all the links to differ from one another with respect to their design, for instance with respect to their respective longitudinal extent and/or their respective extent along the normal direction. The joint axes of the articulated joints are, however, preferably at least regularly spaced apart from one another. In accordance with an advantageous embodiment, all the pairs of two respective articulated joints that follow one another along the serial arrangement have the same spacing between their joint axes. In this respect, all the links of the arrangement may in particular have the same longitudinal extent. However, said spacing may also vary depending on the embodiment.

Said serial arrangement may comprise first links and second links that follow one another in an alternating manner along the sequence of the links of the arrangement. The articulated joints therefore each couple a first link and a second link to one another, namely either a first link to a second link following it (along the sequence of the links of the arrangement) or a second link to a first link following it (along the sequence of links of the arrangement). The designation of the links as first links and second links in this respect primarily serves for the conceptual differentiation of the links on the basis of their respective position within the serial arrangement. The links at a position having an odd ordinal number (1st, 3rd, etc.) may in particular be the first links, while the links at a position having an even ordinal number (2nd, 4th, etc.) are the second links. In this respect, said first end link is one of the first links of the arrangement. Depending on the total number of links of the arrangement, the second end link of the arrangement may be one of the first links or one of the second links of the arrangement. Where a first link of the arrangement or a second link of the arrangement is spoken of in the following, this in each case serves to refer to one or more links at a corresponding position within the arrangement.

The first links do not necessarily have to differ from the second links in this respect. Furthermore, neither the first links nor the second links are in each case necessarily of the same kind as another. However, the first links and/or the second links are each preferably substantially of the same kind as one another, in particular of the same construction (possibly with the exception of the first and/or the second end link of the arrangement). Furthermore, it may be expedient for the first links to differ from the second links.

Said links of the arrangement may generally again be further subdivided, wherein the sub-links may be movable, in particular pivotable, relative to one another. However, all the links of the arrangement are preferably each rigid. The links of the arrangement may in particular comprise a hardened metal as the material.

Because the chain comprises said serial arrangement of links pivotably coupled to one another, the chain is in this respect at least partly configured, preferably at least substantially completely configured, as a sprocket chain. Such a sprocket chain of links connected by articulated joints is to be distinguished from a link chain of links that engage into one another in a ring shape and that may each be pivoted relative to the preceding or following link largely freely in all three spatial directions and may also be displaced to a limited extent.

In accordance with the present disclosure, said serial arrangement may be folded into a compact storage configuration in which, at each of the articulated joints, the two links coupled to one another via the respective articulated joint are pivoted relative to one another about the joint axis of the respective articulated joint to such an extent that they enclose the smallest possible angle within the framework of their relative pivotability. The angle enclosed by the two links is in this respect considered as the smaller of the two angles that may be defined between the two links and that together result in a full angle of 360°. In addition, the enclosed angle is considered in terms of magnitude and may therefore generally not be less than 0°.

In this respect, the links of the arrangement in the compact storage configuration, which are coupled to a respective preceding link via a respective link, may be pivoted in an alternating manner in a first pivot direction and in a second pivot direction opposite to the first pivot direction relative to the respective preceding link about the joint axis of the respective articulated joint to such an extent that they enclose the smallest possible angle within the framework of their relative pivotability.

When the links of the arrangement, as explained above, are distinguished as first links and second links, at each articulated joint that couples a first link of the arrangement to a second link of the arrangement preceding it (along the sequence of links of the arrangement), the first link may in particular be pivoted in the first pivot direction relative to the second link preceding it about the joint axis of the respective articulated joint to such an extent that the two links enclose the smallest possible angle within the framework of their relative pivotability and, at each articulated joint that couples a second link of the arrangement to a first link of the arrangement preceding it (along the sequence of links of the arrangement), the second link may be pivoted relative to the first link preceding it in the second pivot direction about the joint axis of the respective articulation to such an extent that the two links enclose the smallest possible angle within the framework of their relative pivotability.

In all of these cases, said smallest possible angle is related to the pivotability of the two links of the arrangement enclosing the angle relative to one another, i.e. to how far the one link may be pivoted relative to the other link. In other words, the angle is the smallest possible angle within the framework of the relative pivotability of the two respective links in that it may either generally not become smaller because the two links enclose an angle of 0° or in that it corresponds to a limit of the relative pivotability beyond which the two links may not be pivoted toward one another. This will be explained in more detail in the following.

In general, the relative pivotability of two consecutive links of the arrangement coupled to one another via a respective articulated joint may be unrestricted such that a full rotation of the one link relative to the other link about the joint axis is possible.

However, the relative pivotability of two consecutive links coupled to one another via a respective articulated joint may also be limited to a specific pivot range. The limitation may in particular arise from the fact that the links meet one another on the pivoting and therefore may not be pivoted up to and into the same orientation relative to the joint axis of the respective articulated joint, which would correspond to an enclosed angle of 0°. The angular extent of the limited pivot range is in this respect preferably identical for all said articulated joints. For example, the angular extent may be in the range between 300° and 350°; it is preferably in the range between 320° and 345°; it may in particular amount to approximately 330°, approximately 335°, or approximately 340°. Compared to an extended position in which two mutually coupled links are each arranged along a straight line with respect to their longitudinal extent, the one of the two links may in particular be pivotable relative to the other by a maximum of less than 180°. For example, the one link may be pivoted relative to the other at a maximum by an angle in the range between 150° and 175°, preferably at a maximum by an angle in the range between 160° and 172.5°, in particular at a maximum by an angle of approximately 165°, approximately 167.5°, or approximately 170°.

Two cases may therefore be distinguished: Provided that two links of the arrangement coupled to one another via a respective articulated joint may be pivoted relative to one another into a position in which they enclose an angle of 0°, i.e. face in the same direction from the joint axis of the respective articulated joint, said smallest possible angle within the framework of the relative pivotability of the two links corresponds to this angle of 0°, and indeed irrespectively of whether the relative pivotability of the two links is otherwise limited or not. If, in contrast, the relative pivotability of two links of the arrangement coupled to one another via a respective articulated joint is limited such that they may not adopt such a position, said smallest possible angle within the framework of the relative pivotability of the two links corresponds to one of the two boundaries of the pivot range to which the relative pivotability of the two links is limited, in particular to that one of the two boundaries at which the two links enclose the angle of smaller magnitude. Said smallest possible angle may in this respect, for example, be less than or equal to 30°, preferably less than or equal to 25°, in particular less than or equal to 20°, for example, amount to approximately 15°.

The fact that two links of the arrangement, which are coupled to one another via a respective articulated joint, meet one another on the pivoting, and their relative pivotability is thus limited, may in particular result in that two or more links of the arrangement at least partly adopt the same position along the normal direction. Provision may, for example, be made that, at each articulated joint that couples a respective link to a link preceding it, the respective link and the link preceding it at least partly adopt the same position along the normal direction.

Two links that at least partly adopt the same position along the normal direction do not necessarily have to extend over the same region along the normal direction, but may have different extents with respect to the normal direction and/or may be offset relative to one another along the normal direction, but only to the extent that they still overlap with respect to the normal direction. In this respect, such an embodiment in particular differs from jointed bar locks whose links are each formed by a single jointed bar and, with respect to the direction with which the joint axes of the articulated joints coupling the jointed bars are aligned in parallel, are arranged offset from one another similarly to the links of a yardstick such that they do not overlap along this direction, but have different positions and such that two consecutive jointed bars may consequently each be pivoted freely past one another.

Because two links that at least partly adopt the same position along the normal direction overlap with respect to the normal direction, there is thus always a plane perpendicular to the normal direction for two such links that intersects both links. In accordance with a preferred embodiment, provision may in particular be made that there is a plane perpendicular to the normal direction that intersects all the links of the arrangement. The extent of a respective link along the normal direction may in this respect be defined by the spacing, in particular the outer spacing, of two link plates of the respective link (if the respective link has more link plates: of the two outermost link plates of the respective link) such that a plane perpendicular to the normal direction intersects the respective link when the plane extends between the two link plates, in particular between their respective outer sides.

Unless one of two links of the arrangement that are coupled to one another via a respective articulated joint and that at least partly adopt the same position along the normal direction may be passed through the other (for instance through a passage opening of the other), the links meet one another at some point when they are pivoted toward one another relative to one another such that their relative pivotability is limited and the smallest possible angle they may enclose within the framework of their relative pivotability corresponds to that angle at which they meet. For this reason, the serial arrangement of the chain in accordance with the present disclosure or of the chain of the chain lock in accordance with the present disclosure may not be folded in the manner of a yardstick when the smallest possible angle that two consecutive links of the arrangement may enclose within the framework of their relative pivotability is greater than 0°. Nevertheless, the storage configuration may also be comparatively compact in this case, in particular if, as explained above, the links of the arrangement in the storage configuration are pivoted in an alternating manner in a first pivot direction and a second pivot direction opposite thereto relative to the respective preceding link about the joint axis of the respective articulated joint such that the arrangement has a zigzag-like course in its storage configuration.

In this respect, in the storage configuration, all the angles between a respective (first) link, which is pivoted in the first pivot direction relative to the link preceding it, and the (second) link of the arrangement preceding said respective (first) link may be identical to one another. Moreover, in the storage configuration, all the angles between a respective (second) link, which is pivoted in the second pivot direction relative to the link preceding it, and the (first) link of the arrangement preceding said respective (second) link may be identical to one another. Furthermore, in the storage configuration, all the angles between a respective link and the link of the arrangement preceding it may be identical to one another.

Furthermore, when the links of the arrangement, as explained above, are distinguished as first links and second links, in the storage configuration, all the first links of the arrangement may be aligned parallel to one another and may be arranged offset from one another along a longitudinal extent of the arrangement folded in a compact manner perpendicular to the normal direction; the first links are in this respect preferably not arranged offset from one another along the normal direction, but all have the same position with respect to the normal direction. Moreover, in the storage configuration, all the second links of the arrangement may be aligned parallel to one another and may be arranged offset from one another along a longitudinal extent of the arrangement folded in a compact manner perpendicular to the normal direction; the second links are in this respect preferably not arranged offset from one another along the normal direction, but all have the same position with respect to the normal direction. When both the first links and the second links are in each case aligned parallel to one another in the storage configuration, the direction in which the first links are in this respect aligned parallel to one another and the direction in which the second links are in this respect aligned parallel to one another are different from one another. The two directions may, for example, enclose an angle between them in the range between 10° and 60°, in particular an angle in the range between 15° and 40°, preferably an angle of approximately 20°, 25°, or 30°.

In the storage configuration, the first links of the arrangement may furthermore contact one another laterally, i.e. in a direction perpendicular to the normal direction and transverse to the longitudinal extent of the respective link, and/or the second links of the arrangement may contact one another laterally, i.e. in a direction perpendicular to the normal direction and transverse to said longitudinal extent of the respective link. The pivotability of a respective first and/or second link may in particular be limited precisely by the fact that it laterally impacts the respective next-but-one preceding or following link of the arrangement if such a one is present.

In addition to the compact storage configuration, the arrangement may also have an extended longitudinal configuration. The extended longitudinal configuration may in particular be defined in that the arrangement therein extends along a longitudinal direction perpendicular to the normal direction, and/or in that the joint axes of all the articulated joints that couple the two respective links of the arrangement are arranged therein along a longitudinal direction (in particular said longitudinal direction) perpendicular to the normal direction, and/or in that a first end of the arrangement and a second end of the arrangement opposite thereto are spaced apart from one another at a maximum therein, i.e. as far as possible within the framework of the pivotability of the links of the arrangement relative to one another.

The compact storage configuration may have a greatly reduced length, in particular in comparison with the longitudinal configuration described. The chain may thereby be particularly easy to stow and to transport. For example, a pocket may be provided for the chain which is adapted to the dimensions of the chain in the storage configuration and in which the chain may therefore be received in a flush manner.

The chain in accordance with the present disclosure further comprises a pulling device which extends along said serial arrangement and by way of which a first end of the arrangement and a second end of the arrangement opposite thereto may be pulled toward one another such that the arrangement is brought into the compact storage configuration by the pulling device.

Said first end of the arrangement may, for example, be said first end link of the arrangement or a part thereof. Said second end of the arrangement may, for example, be said second end link of the arrangement or a part thereof. An end section that forms the first end of the arrangement may in particular be formed at the first end link. In addition, an end section that forms the second end of the arrangement may be formed at the second end link. The end section may in each case, for example, be formed by a free end of the respective end link, i.e. an end that is not coupled to any other of the links of the arrangement. Alternatively thereto, the end section may in particular also be formed by the articulated joint between said first end link and the link of the arrangement following it, or between said second end link and the link of the arrangement preceding it. The pulling device may in particular be connected to the end section of one of the two end links or also to the end sections of both end links.

The fact that the pulling device extends along the arrangement may in particular comprise that the pulling device extends along each link of the arrangement, for example, is guided by each of the links of the arrangement, extends through each of the links of the arrangement, and/or surrounds each of the links of the arrangement.

The pulling device is configured such that the first end of the arrangement and the second end of the arrangement may be pulled toward one another by way of the pulling device. For this purpose, the pulling device does not necessarily have to engage at both ends of the arrangement. For example, said property of the pulling device may comprise that when the first end of the arrangement is fixedly held, the second end of the arrangement may be pulled toward the first end of the arrangement by way of the pulling device, and/or may comprise that when the second end of the arrangement is fixedly held, the first end of the arrangement may be pulled toward the second end of the arrangement by way of the pulling device. For this purpose, it may be sufficient for the pulling device to engage at one of the two ends of the arrangement, in particular to be fastened to at least one of the two ends of the arrangement. The pulling of the one end of the arrangement toward the other end of the arrangement is to be understood as a relative movement between the two ends. The first and second end of the arrangement may therefore, for example, also be pulled toward one another by way of the pulling device in that one of the two ends is held in a substantially stationary manner by way of the pulling device and the other end is moved, e.g. dropped, toward this one end.

The first end and the second end of the arrangement may be pulled toward one another in a specific manner by way of the pulling device, namely such that the arrangement is thereby brought into the compact storage configuration. The pulling device is in particular configured such that, in that the first and second end of the arrangement are pulled toward one another by way of the pulling device, it is substantially inevitably simultaneously brought about that the arrangement adopts its storage configuration. For this purpose, one or more, in particular all, of the links of the arrangement may be correspondingly guided by the pulling device on the pulling toward one another of the ends of the arrangement such that the pulling device folds the arrangement into the storage configuration.

Many different possibilities of a cooperation of the pulling device with the arrangement or with at least some links of the arrangement are conceivable, which has the result that the arrangement is brought into its storage configuration on a pulling of the two ends of the arrangement toward one another. In this respect, it is in each case provided that the pulling device, by way of which the pulling takes place, is specifically configured to at least largely ensure at the same time that not only the ends of the arrangement are moved toward one another, but the arrangement as a whole with its links following one another from the first end to the second end of the arrangement is in this respect folded in an orderly manner, namely such that, in accordance with the storage configuration, at each of the articulated joints, the links coupled to one another via the respective articulated joint are pivoted relative to one another to such an extent that they enclose the smallest possible angle within the framework of their relative pivotability. For this purpose, the pulling device may in particular be configured to urge the links of the arrangement relative to the respective preceding link in an alternating manner in a first pivot direction and in a second pivot direction opposite thereto and/or to block them in an alternating manner against a pivoting in the second pivot direction or in the first pivot direction.

The design of the chain in accordance with the present disclosure—in particular the foldability into the compact storage configuration as well as the pulling device provided for a simple folding—makes it possible that the chain may have a large number of comparatively short links and may thus also be laid around tight curves, but is nevertheless comfortably foldable in a compact manner to be stowed or to be transported. In this respect, a chain of said kind, in particular by rigid links composed of a hard material and fixed articulated joints, may have a high security against being broken open and a comparatively low weight at the same time.

In accordance with an advantageous embodiment, the pulling device comprises an elongate pulling element, in particular a rope-like pulling element, that extends along the arrangement. The pulling element may in particular be fixedly connected to the second end of the arrangement, e.g. to said end section, such that the second end of the arrangement may be pulled toward the first end of the arrangement via the pulling element. Provided that the chain extends beyond the second end of the arrangement, the pulling element may likewise extend beyond the second end of the arrangement up to a section of the chain or of the respective chain lock having the chain, e.g. up to a lock body of the chain lock, to which it is fixedly connected such that, by pulling at the pulling element, this section and via it at least indirectly also the second end of the arrangement may be pulled toward the first end of the arrangement.

The pulling element may, for example, be configured as a rope, a string, or a cord and may comprise a fiber, a plastic, and/or a metal as the material. The pulling element may, for example, be a pulling rope. The pulling element may in particular be configured as a wire rope or a steel cable that preferably has a plastic jacket.

The pulling device may also comprise more than one pulling element. In this respect, a plurality of pulling elements may extend along said arrangement. Alternatively or additionally, provision may, however, also be made that the chain comprises a plurality of arrangements along each of which one or more pulling elements extend. The possibilities described or described in the following of how a single pulling element may be formed also apply in a corresponding manner to a plurality of pulling elements. In this respect, the plurality of pulling elements may each be of the same kind. However, it is also possible that different pulling elements are formed in one or more different ways, in particular in different ones of the ways described.

In accordance with an advantageous embodiment, the pulling element has a slalom-like course about the joint axes of the articulated joints. In this respect, the course is in particular slalom-like in that the pulling element passes the articulated joints in accordance with their sequence along the serial arrangement of consecutive links in an alternating manner in the one direction of rotation and the other direction of rotation relative to the joint axis of the respective articulated joint. In other words, the pulling element extends past the joint axis of each second articulated joint at the one side (e.g. at the right) and past the joint axis of each of the remaining articulated joints at the other side (e.g. at the left). When the links of the arrangement are distinguished as first links and second links as explained above, the pulling element may in particular pass the joint axes of the articulated joints which connect a first link to a subsequent second link in the respective direction of rotation that corresponds to said first pivot direction, while the pulling element passes the joint axes of the articulated joints which connect a second link to a subsequent first link in the respective direction of rotation that corresponds to said second pivot direction.

When the arrangement is in said extended longitudinal configuration, the pulling element consequently winds about the joint axes. In contrast, in the compact storage configuration, the articulated joints which each connect a first link to a subsequent second link may, for instance due to the zig-zag course described, all be arranged at one side of the compact package into which the arrangement is folded in the storage configuration, and the articulated joints which each connect a second link to a subsequent first link may be arranged at the side opposite thereto while the pulling element extends between these two sides. The pulling element may then therefore also have an at least largely straight course that is, however, nevertheless slalom-like with respect to the joint axes because the pulling element extends past the joint axis of each second articulated joint at the one side and past the joint axis of each of the remaining articulated joints at the other side.

The slalom-like course, in which the pulling element passes the joint axes of the articulated joints in an alternating manner in opposite directions of rotation, may advantageously have the result that, on a pulling of the pulling element, the links of the arrangement are correspondingly pivoted in an alternating manner in the one and in the other pivot direction with respect to the respective preceding link. The slalom-like course therefore causes—or thus in any case contributes to—the arrangement being able to be brought into the storage configuration by way of the pulling device.

The pulling element is preferably not only basically arrangeable in said slalom-like course or may simply randomly have said slalom-like course, but the slalom-like course is fixedly predefined for the pulling element. The pulling element may in particular for this purpose be guided at the arrangement, in particular at the links of the arrangement, such that it has the slalom-like course.

In accordance with a further advantageous embodiment, a winding mechanism is provided at the pulling element by way of which the pulling element may be wound up. In other words, the winding mechanism is configured to wind up the pulling element. This may in particular be expedient in order to wind up an excess of the pulling element, by which the pulling element projects over the folded arrangement or over the chain, after a folding of the arrangement into the compact storage configuration. In this respect, the winding mechanism is in particular useful when the pulling element itself is at least largely inelastic.

The winding mechanism may be formed as a part of the pulling device of the chain. Furthermore, the winding mechanism may be arranged at, in particular in, the lock body of the chain lock at which the chain is or may be provided and/or may be formed as part of the lock body.

The winding mechanism may comprise a drive unit that is configured to drive the winding mechanism to wind up the pulling element. In this respect, the winding mechanism may be configured to be adjusted between an activated state, in which the winding mechanism winds up the pulling element driven by the drive unit, and a deactivated state in which the drive effected by the drive unit is suspended (e.g. compensated or blocked). In this respect, provision may be made that the pulling element may still at least be unwound in the deactivated state, namely in particular by manually pulling the pulling element in the direction away from the winding mechanism. However, it may also be the case that an unwinding of the pulling element is blocked in the deactivated state, whereby it may further be possible to secure the arrangement in its compact storage configuration. The winding mechanism preferably automatically adopts the deactivated state as long as it is not adjusted into the activated state by a user of the respective chain lock.

The drive unit may in particular be configured as a preloading apparatus whose preload may drive the winding up of the pulling element. For this purpose, the preloading apparatus may comprise a spring, for example. Due to a manual unwinding of the pulling element, the preloading apparatus is in this respect advantageously in each case at least substantially preloaded again by the amount that was previously applied for the winding up of the pulling element such that the preloading apparatus may always provide sufficient drive for the winding up of the pulling element.

The winding mechanism may in particular be configured in the manner of the mechanism of a measuring tape that may be rolled up. In addition to a preloading apparatus as the drive unit, such a winding mechanism further comprises an actuation element and is configured to be adjusted between the activated state and the deactivated state by way of the actuation element. The actuation element may in particular be configured in the form of a push button. By pressing the push button, the winding mechanism may then be adjusted into the activated state and the excess part of the pulling element may thereby be easily and quickly wound up.

In accordance with a further advantageous embodiment, the pulling element is elastic. The pulling element may in particular be configured as an elastic pulling rope, as a tension cable, as a tension rubber, or as an elastic band. However, the pulling device may also comprise a non-rope-like elastic pulling element, for example an elastic jacket, in particular an elastic hose, as will be further explained in the following.

The elastic pulling element may in particular be configured such that it preloads the first and second end of the serial arrangement of consecutive links into the storage configuration. For example, the elastic pulling element may always pull the first end and the second end of the arrangement toward one another and may thereby automatically bring them into the storage configuration, at least as long as the arrangement is not already in the storage configuration and provided that the arrangement is not held against the preload in a different state, for example, because the chain is currently being used to secure an object. The elastic pulling element may in particular be connected, on the one hand, to the first end of the arrangement or to a section of the chain or of the respective chain lock located beyond the first end and, on the other hand, to the second end of the arrangement or to a section of the chain or of the respective chain lock located beyond the second end in order to pull the two ends toward one another. Furthermore, one of the ends of the pulling element may be fastened to a lock body of the respective chain lock having the chain.

In accordance with a further advantageous embodiment, each of the links of the arrangement has a respective passage opening, wherein the pulling element extends through the passage opening of each link. The pulling element may hereby be guided at the arrangement, in particular such that it has the explained slalom-like course. For this purpose, it is particularly expedient if the pulling element extends in a first passage direction through the passage opening of each first link and in an opposite second passage direction through the passage opening of each second link. The passage openings may in particular extend in a direction transverse, in particular perpendicular, to the normal direction and transverse, in particular perpendicular, to the longitudinal extent of the respective link through the respective link.

In accordance with a further advantageous embodiment, each of the links of the arrangement comprises two respective link plates that are arranged offset from one another along the normal direction, wherein each of the two link plates extends from a first end of the respective link, at which the articulated joint is configured for coupling to the link preceding the respective link, to a second end of the respective link which is opposite to said first end and at which the articulated joint is configured for coupling to the link following the respective link. It is understood that, at the first end of the respective link, an articulated joint is only configured for coupling to the link preceding the respective link if a link actually precedes it, which is in particular not necessarily the case for said first end link. In a corresponding manner, it is understood that, at the second end of the respective link, an articulated joint is only configured for coupling to the link following the respective link if a link actually follows it, which is in particular not necessarily the case for said second end link.

The links of the arrangement are in this respect not limited to having exactly two link plates. In addition to said two link plates, the links of the arrangement may each also comprise further link plates, in particular link plates of the same kind. When the two link plates of a respective link are spoken of in the following, this preferably in each case refers to the two outermost link plates of the respective link along the normal direction in the case of links that have more than two link plates.

The link plates of a respective link are also designated as tabs and may each be configured as rigid, flat, and elongate plates and/or have the same shape as one another. The link plates are preferably aligned parallel to one another, in particular in each case perpendicular to the normal direction. The material of the link plates may in particular comprise a hardened metal.

The links of the arrangement may each, apart from elements that are to be associated with one of the articulated joints, substantially consist of said link plates. In other words, the links, possibly with the exception of the first and/or the second end link, may each only comprise the link plates and at most also elements that form part of a respective articulated joint (e.g. one or more pins or sleeves and, where necessary, rollers, as will be explained further below), but preferably no other elements. Such a design contributes to a low weight of the chain.

If the links each comprise (at least) two link plates, said passage openings may each be formed between the two link plates of the respective link and between the first end of the respective link, in particular the articulated joint possibly provided at this end, and the second end of the respective link, in particular the articulated joint possibly provided at this end. The passage opening then therefore does not first have to be formed, e.g. as a hole or a recess, in the element on the manufacture of the respective element, but advantageously already results from the basic structure of the respective link.

The two link plates of a respective link have a spacing from one another with respect to the normal direction along which they are arranged offset from one another. Because the link plates each have a certain thickness, the outer spacing, the middle spacing, or the inner spacing may in this respect be considered as the spacing. The spacing between the two link plates is preferably the same for all the first links of the arrangement and/or the spacing between the two link plates is preferably the same for all the second links of the arrangement, wherein the spacing may be different for the first links than for the second links.

The links of the arrangement may in particular alternately have a larger spacing and a smaller spacing between their two respective link plates. For example, the spacing of the two link plates may be larger for the first links than for the second links. The inner spacing of the link plates is in this respect preferably larger in the case of the first links than the outer spacing of the link plates in the case of the second links. In this way, in the region of an articulated joint coupling two links to one another, the link plates of the second link may in each case be arranged between the link plates of the first link with respect to the normal direction. If, as described further above, the first links laterally contact one another in the storage configuration, the second links, which are both preceded by a first link and followed by a first link, may each be at least partly arranged, in particular completely arranged, between the link plates of these two first links in the storage configuration. The same correspondingly applies if, in exactly the other way around, the spacing of the two link plates is larger for the second links than for the first links.

The inner spacing of the link plates in the case of the links having the larger spacing may in particular be virtually identical (with a deviation of less than 1 mm, in particular less than 0.5 mm) with the outer spacing of the link plates in the case of the links having the smaller spacing such that, in the region of an articulated joint, the link plates of the one link in each case contact one of the link plates of the other link.

The spacing between the two link plates is preferably constant along the total longitudinal extent of a respective link or at least identical at the two ends of the respective link. The spacing may in this respect, for example, be in the range between 0.5 cm and 4 cm. However, the spacing between the two link plates of a respective link may also change along the longitudinal extent of the link, for example, if the link plates are obliquely arranged with respect to the normal direction and/or are formed in a stepped manner.

In such a case, it is preferred if the spacing between the two link plates is larger at the first end of the respective link than at the second end of the respective link. In this respect, the inner spacing at the first end is preferably larger than the outer spacing at the second end, wherein these spacings may be almost identical (with a deviation of less than 1 mm, in particular less than 0.5 mm). The spacings of the two link plates at the first end of the respective link may in particular be identical for all the links of the arrangement and the spacings of the two link plates at the second end of the respective link may likewise be identical for all the links of the arrangement.

In particular in the case of links whose two link plates do not have a constant spacing from one another, but also in general, it may furthermore be expedient if the first and/or second links of the arrangement do not have a straight course perpendicular to the normal direction, but a curved, bent, or kinked course from their first to their second end.

However, it is not only with respect to the spacing of the two link plates that the links of the arrangement may differ from one another in terms of their dimensions, but also with respect to their longitudinal extent from their first to their second end. In accordance with a further embodiment, provision may be made that, along the sequence of the links of the arrangement, both the spacing between the two link plates of a respective link and the spacing between the first end and the second end of the respective link either continuously decreases, i.e. increases further with each further link, or continuously increases, i.e. increases with each further link.

Because the spacing between the first end and the second end of a respective link decreases or increases from link to link, the spacing between the joint axes of consecutive joint links also decreases or increases. In this respect, provision may in particular be made that the spacings at the next-smaller link are so much smaller relative to a respective link that the next-smaller link may be pivoted in between the link plates of the respective link, in particular until it is arranged precisely antiparallel (that is enclosing an angle of 0° with the respective link) within the respective link. In this way, it may be possible for the links of the arrangement to be nested within one another in the compact storage configuration, which enables a particularly compact stowing of the arrangement.

Because such an arrangement, whose links may become progressively larger or smaller, may not be of arbitrary length, it is in particular expedient in such an embodiment if the chain comprises a plurality of serial arrangements of consecutive links that may each be folded into a compact storage configuration, as will be explained in more detail further below. If two or more serial arrangements are in this respect formed in the manner described above, that is comprise links whose dimensions (both the spacing between the two link plates of the respective link and the spacing between the first and the second end of the respective link) continuously decrease or continuously increase, it may be expedient if a serial arrangement in which the dimensions of the links continuously decrease is followed by a serial arrangement in which the dimensions of the links continuously increase, and/or vice versa. In a chain in accordance with the present disclosure or the chain of a chain lock in accordance with the present disclosure, one or more serial arrangements in which the dimensions of the links continuously decrease or increase may also be combined with one or more serial arrangements that are formed in a different way, for example, in which the links all have the same spacing between the first and second end of the respective link and in which only the spacing between the two link plates of the respective link is alternately larger and smaller (as explained further above).

The serial arrangement of alternatingly consecutive links may in particular be configured as a pin chain in which the articulated joints are substantially formed by pins that engage through the link plates of the links coupled by the respective articulated joint at their respective ends. The pin then defines the joint axis of the respective articulated joint. The total chain may in particular be configured as such a pin chain.

If the links of the arrangement each comprise more than two link plates, the arrangement or the total chain may also be configured as a leaf chain. If the links of the arrangement are distinguished as first links and second links, as explained above, and either the first links or the second links of the arrangement each have two link plates, but the respective other links of the arrangement have a block-like body, the arrangement or the total chain may in particular also be configured as a block chain.

In accordance with a further advantageous embodiment, the articulated joints each comprise a pin, which is formed at the one link coupled by the respective articulated joint (for example, at the first link coupled by the respective articulated joint), and a sleeve which is formed at the other link coupled by the respective articulated joint (for example, at the second link coupled by the respective articulated joint) and which is engaged through by the pin such that said sleeve is pivotable about the pin. In this respect, the arrangement, in particular the total chain, may be configured as a sleeve chain (also called a bush chain).

The sleeve may in particular have a cylindrical shape having open end faces. The pin may be received in the sleeve and may engage through the sleeve in that it extends through both open end faces in so doing. For this purpose, it is expedient that the pin has a larger axial length than the sleeve. Provided that the two links coupled by the respective articulated joint each have two link plates, the pin may be guided through openings or bores, which are formed in the total of four link plates at the mutually coupled ends of the two links, and may, for example, be fixed therein by expanded peripheral portions at the ends of its axial extent. The sleeve may connect the openings or bores of the inner two of the four link plates in the region of the respective articulated joint and may thus simultaneously act as a spacer for the link plates.

The articulated joints may furthermore each comprise a roller that is rotatably supported about the sleeve and that preferably at least substantially has the same axial extent as the sleeve. The arrangement, in particular the total chain, may in this respect be configured as a roller chain.

In accordance with a further advantageous embodiment, the chain comprises a hose-like arrangement in which at least the arrangement is received. This means that the jacket extends at least from the first end up to the second end of the arrangement and in this respect envelops the arrangement in a hose-like manner. The jacket preferably at least substantially extends—in particular only apart from end sections of the chain that have elements for a locking of the chain—over the total chain. Such a jacket may protect the chain and in particular also the articulated joints, for example, from contamination. In addition, a jacket may also serve to protect the object to be secured from damage by possibly sharp edges of the chain.

In this respect, it is preferred that the jacket always completely envelops the arrangement, i.e. from the first end of the arrangement up to its second end, irrespectively of the respective configuration of said arrangement. In this respect, the chain may in particular comprise a hose-like jacket that envelops the arrangement from its first end up to its second end both in the compact storage configuration and in an extended longitudinal configuration of the arrangement in which the first end of the arrangement and the second end of the arrangement are spaced apart from one another at a maximum. The jacket then preferably also envelops the arrangement in all further possible configurations, that is in all the states that may be adopted by the arrangement between the compact storage configuration and the extended longitudinal configuration.

The jacket may further be configured to have a straight course at least along the arrangement when the jacket envelops the arrangement in the compact storage configuration. The jacket therefore preferably does not also follow the zig-zag course that the arrangement has in the storage configuration, but continues to envelop the folded arrangement substantially in the manner of a convex shell. For this purpose, the jacket may in particular similarly to the arrangement itself be configured as foldable to be able to participate in the length change on a transition from the extended longitudinal configuration into the compact storage configuration. For example, the jacket may be able to be folded or gathered, in particular in an ordered and/or guided manner, e.g. in the manner of a bellows.

Alternatively or additionally thereto, the jacket may also be elastic such that it may adapt its length to the respective longitudinal extent of the enveloped arrangement in accordance with the respective configuration of said arrangement.

Furthermore, the jacket may also act as part of the pulling device. Said elongate pulling element may in particular also be formed by the jacket. This is because if the jacket is elastic, it may act as an elastic pulling element as has been described further above. The jacket may in particular be fixedly connected to the first end and to the second end of the arrangement and may be configured, due to its elasticity, to pull these two ends toward one another and thereby to preload the arrangement into its storage configuration.

However, the jacket does not necessarily have to be elastic in order to act as a part of the pulling device. For example, the jacket may be configured such that, when it is folded, for example in that the ends of its longitudinal extent are gripped and moved toward one another, the ends of the arrangement received in the jacket are thereby likewise moved toward one another and the arrangement is consequently brought into its storage configuration, in particular also due to the restriction of the movability of the arrangement caused by the jacket. In this respect, a mechanism for a guided folding of the jacket may be provided at the jacket; for example, one or more pulling ropes may extend at the inner side of the jacket that are fixedly connected to one end of the jacket and that project from the other end of the jacket such that the jacket may be gathered and thus shortened by pulling at the pulling ropes.

In accordance with a further advantageous embodiment, the chain comprises a fixing device for fixing the arrangement in the compact storage configuration. The fixing device may in particular be formed as part of the pulling device or at the pulling device. For example, the fixing device may comprise a fixing element that is fixedly connected to the one end of the arrangement and that, when the arrangement is in the compact storage configuration, may be releasably fastened to the other end of the arrangement to limit the spacing of the two ends of the arrangement from one another such that the arrangement is thereby held in the storage configuration. Such a fixing element may in particular be formed by said elongate pulling element, at least provided that it is not elastic. For a releasable fastening, the fixing device may, for example, comprise a clamping apparatus to which the fixing element may be fixedly clamped or the fixing device may comprise a hook at which the fixing element or a loop or an eyelet formed at the fixing element may be hooked in.

In accordance with a further advantageous embodiment, the chain comprises, in addition to said serial arrangement, a further serial arrangement of consecutive links that is preferably configured at least substantially in the same manner as said serial arrangement and that may therefore also in each case have the possible features and properties described for said serial arrangement.

The further serial arrangement may in particular be folded into a compact storage configuration in which, at each articulated joint that couples a respective link of the further arrangement to a link of the further arrangement preceding it, the respective link is pivoted relative to the link preceding it about the respective joint axis to such an extent that the respective link and the link preceding it enclose the smallest possible angle within their relative pivotability. Depending on how the two arrangements are or may be arranged relative to one another, the normal direction with which the joint axes of the articulated joints of a respective arrangement are in parallel does not in this respect have to be identical for both arrangements. In this respect, the folding of the further arrangement into its storage configuration is preferably possible independently of the folding of said arrangement into its storage configuration.

Furthermore, the two arrangements preferably each have the same number of links. When the links of the arrangement are distinguished as first links and second links as explained above, the first links of the one arrangement may be formed in a corresponding manner to the first links of the further arrangement and the second links of the first arrangement may be formed in a corresponding manner to the second links of the further arrangement. The two arrangements, when they each adopt their storage configuration, may in particular have at least substantially the same dimensions.

Furthermore, at least a part of said pulling device may also extend along the further arrangement, wherein a first end and a second end of the further serial arrangement may be pulled toward one another by way of the pulling device such that the further arrangement is brought into its compact storage configuration by the pulling device. In this respect, one part of the pulling device may be provided for the folding of the one arrangement, i.e. the arrangement already mentioned further above, and another part of the pulling device may be provided for the folding of the further arrangement into the respective storage configuration. The pulling device may therefore be formed in multiple parts, wherein said parts of the pulling device may be formed separately from one another and may in particular also be arranged spaced apart from one another.

In this respect, both arrangements are preferably coupled in an articulated manner to one another such that when they are each folded into their compact storage configuration, they may be arranged offset in parallel from one another, in particular adjacent to one another. In this respect, the arrangements may in particular be able to be arranged parallel to one another with respect to their respective longitudinal extent perpendicular to the normal direction along which, in the storage configuration, the first links of the respective arrangement and/or the second links of the respective arrangement may be arranged offset relative to one another.

The two arrangements may in particular be arranged adjacent to one another in that they may be arranged offset from one another and may in this respect at least substantially directly or indirectly, for example via a jacket enveloping the respective arrangement, adjoin one another or even contact one another. In general, a certain intermediate space having a width of, for example, at most 10 mm, preferably at most 5 mm, in particular at most 3 mm, may in this respect remain between the two arrangements. The direction of the offset is in this respect preferably perpendicular to the parallel longitudinal extents of the two arrangements. The direction of the offset may be parallel or perpendicular to the normal direction, wherein it is preferably parallel. In this respect, the two arrangements, provided that they each have the same dimensions in the storage configuration, may in particular be able to be arranged congruently adjacent to one another.

To connect the two arrangements, in particular a respective end, e.g. the second end, of the one arrangement and a respective end, e.g. the second end, of the further arrangement may in this respect be coupled to one another in an articulated manner. The coupling may take place directly or indirectly, in particular via one or more connection links that may e.g. be configured in the manner of a first and/or a second link of at least one of the arrangements. In this respect, the two arrangements may be coupled to one another via one or more articulated joints. These articulated joints may in particular each have a joint axis about which the parts coupled via the respective articulated joint may be pivotable relative to one another and which may, for example, be aligned parallel to the normal direction.

If the joint axes of all such articulated joints are aligned parallel to the normal direction and if all the links of a respective arrangement at least substantially have the same position with respect to the normal direction, the two arrangements may be pivotable relative to one another only within a plane perpendicular to the normal direction. In this case, the two arrangements may adjoin one another or contact one another offset from one another only in a direction perpendicular to the normal direction.

However, the joint axis of at least one articulated joint via which the two arrangements are coupled to one another may also be oriented transversely, in particular perpendicular, to the normal direction. In particular by pivoting about this joint axis, the two arrangements may then also be arranged adjacent to one another with respect to the normal direction, that is adjoining one another or contacting one another offset from one another along the normal direction. If the arrangements in their storage configuration each have a larger width (i.e. extent perpendicular to the normal direction and perpendicular to the longitudinal extent) than height (i.e. extent parallel to the normal direction), the chain or at least the part of the chain comprising the two arrangements may be folded in a particularly compact manner by such an adjacent positioning of the two arrangements.

However, such an adjacent positioning of the two arrangements with respect to the normal direction does not necessarily require an articulated joint having a joint axis oriented transversely to the normal direction. An embodiment is also possible in which the links of a respective arrangement have at least substantially the same position as one another with respect to the normal direction, but the links of the one arrangement are arranged offset relative to the links of the other arrangement with respect to the normal direction, wherein this offset may be permanent and may, for example, be effected by a correspondingly configured connection link via which the two arrangements are coupled to one another. The one arrangement may then be pivoted over or under the further arrangement due to the offset. In this respect, if the offset at least substantially corresponds to the height of one arrangement, the two arrangements may contact one another in the direction of the normal direction in this manner.

The pulling device may, as already explained further above, comprise an elongate pulling element, in particular a rope-like pulling element, which extends along the one arrangement, and may furthermore also comprise a further elongate pulling element, in particular a rope-like pulling element, that extends along the further arrangement. The further pulling element is preferably of the same kind as said pulling element. The further pulling element may in particular in each case likewise have the possible features and properties described further above for said pulling element. The two arrangements may preferably be folded independently of the respective other arrangement by way of the respective pulling element.

The chain may generally also comprise more than two serial arrangements of first and second links that follow one another in an alternating manner and that are preferably configured in at least substantially the same manner as said serial arrangement or the further serial arrangement. Each of the arrangements may in particular be foldable into a storage configuration of said kind by way of the pulling device, in particular by way of a respective part of the pulling device (e.g. one or more elongate pulling elements, in particular rope-like pulling elements), and all of the arrangements may be coupled to one another such that, when they are each in their storage configuration, they may be arranged parallel to one another, in particular adjacent to one another, such that they may overall form a compact package.

The chain lock in accordance with the present disclosure is in particular configured for a two-wheeler and in this respect in particular as a two-wheeler chain lock and has a lock body and a chain in accordance with the present disclosure that may be locked to the lock body. This means that the lock body is configured such that the chain, in particular at least one of two ends of the chain, may be connected to the lock body, wherein a locking mechanism, which is configured to secure this connection against a release, is in particular provided at the lock body. In other words, provision may be made that the lock body has a locking receiver that is configured to receive a section of the chain and furthermore comprises a locking mechanism by way of which said section of the chain may be secured against a departure from the locking receiver.

For example, the chain may have a bolt at its one end for the connection to the lock body. At the lock body, a bolt receiver may then be provided as said locking receiver, into which bolt receiver the bolt may be received, in particular in a latching manner, and in which the bolt received therein may be secured against a departure from the bolt receiver by way of the locking mechanism. In such a case, the bolt therefore forms the (or a) section of the chain that may be received in the locking receiver and that may be secured against a departure from the locking receiver by way of the locking mechanism.

Alternatively thereto, the lock body may also have a different kind of locking receiver that is configured to receive a section of the chain, wherein the received section may then be secured by way of the locking mechanism against a departure from the locking receiver. In this respect, such a section does not necessarily have to be provided at said one end of the chain, but it may generally also be a section in a middle region of the chain. At least one end section formed at the end of the chain may, however, preferably be received in the receiver and may subsequently be secured against a departure from the locking mechanism by way of the locking mechanism.

The locking receiver may in particular be configured to receive a section of a respective link of the chain. In this respect, it may be one of the links of said serial arrangement of consecutive links or, if provided, of a further arrangement of this kind. However, it may also be another link of the chain that is, however, preferably formed in a manner corresponding to a link of a respective arrangement. For example, the locking receiver may be configured to receive, as said section, a respective one of said articulated joints between the links of a respective serial arrangement of the chain or generally between links of the chain. Alternatively or additionally thereto, the locking receiver may be configured to receive, as said section, an end section of an end link of a respective serial arrangement or of an end link of the total chain. This end link may in particular comprise at least two link plates that each extend from a first end to a second end of the end link at which the end link is coupled to a further link of the arrangement or of the chain via an articulated joint, wherein the two link plates are connected to one another at the first end via a pin or a sleeve, and wherein the pin or the sleeve forms said section that may be received in the locking receiver and subsequently secured therein.

The other end of the chain may be permanently fixedly connected to the lock body or it may be connectable to the lock body, in particular in a generally corresponding manner to said section, wherein this connection may be lockable, that is it may be secured against a release by way of a locking mechanism, possibly by way of the same locking mechanism. However, the other end may also neither be connected to the lock body nor configured to be locked to the lock body. For example, an eyelet may be provided at the other end of the chain, through which eyelet the one end of the chain may be led to form a loop and may then be locked to the lock body. An object wrapped around by the loop may be secured to the lock body in this manner or the lock body may be secured to the object in this manner.

The present disclosure also relates, generally independently of the above-described chain in accordance with the present disclosure, to a chain lock, in particular for a two-wheeler, having a lock body and having a chain that comprises a serial arrangement of consecutive links that are coupled to one another via a respective articulated joint between one another and that may be pivoted relative to one another about a joint axis, which is parallel to a normal direction, of the respective articulated joint, wherein the arrangement may be folded into a compact storage configuration in which, at each of the articulated joints, the two links coupled to one another via the respective articulated joint are pivoted relative to one another about the joint axis of the respective articulated joint to such an extent that they enclose the smallest possible angle within the framework of their relative pivotability, wherein the links of the arrangement at least partly adopt the same position along the normal direction, and wherein the lock body has a locking receiver, which is configured to receive a section of the chain, in particular of a link of the chain, and comprises a locking mechanism by way of which said section of the chain may be secured against a departure from the locking receiver.

The explanations set forth above regarding the corresponding features of the chain in accordance with the present disclosure, in particular regarding possibilities of implementing these features, also apply in a corresponding manner to the chain of the present chain lock. Furthermore, the above-described possibilities of forming the locking receiver and/or the one or more sections of the chain or of a link of the chain that may be received in the locking receiver also apply in a corresponding manner to the present chain lock.

The locking receiver may in particular be configured as a bolt receiver and the chain may, at one of its ends, have a bolt that may be locked to the lock body. The fact that the bolt may be locked to the lock body may in particular comprise the bolt forming said section that may be received in the locking receiver and that may be secured against a departure from the locking receiver by way of the locking mechanism. In other words, the lock body may be configured such that the bolt may be received, preferably in a latching manner, in the bolt receiver formed at the lock body, wherein the locking mechanism is configured to secure this connection against a release.

However, the chain does not necessarily have to have a bolt at one of its ends nor does the section that may be received in the locking receiver and secured therein necessarily have to be at one of the ends of the chain. Rather, the locking receiver may, alternatively or additionally, be configured to receive a section in a middle region of the chain that is then secured by way of the locking mechanism against a departure from the locking receiver. For example, as also explained further above, the articulated joints between the links of the one or more serial arrangements of the chain or generally between links of the chain may each form such a section that may be received the locking receiver and that may then be secured against a departure from the locking receiver.

The other end of the chain may be permanently fixedly connected to the lock body or may be connectable to the lock body, in particular in a generally corresponding manner to said section, wherein this connection may be lockable, that is it may be secured against a release by way of a locking mechanism, possibly by way of the same locking mechanism. However, the other end may also neither be connected to the lock body nor configured to be locked to the lock body. In this case, an eyelet is preferably provided at the other end, through which eyelet the one end of the chain may be led and may then be locked to the lock body.

The chain of the chain lock may further be configured like the chain in accordance with the present disclosure, i.e. it may in particular have a pulling device of one of the kinds described further above and it may have one or more of the possible features and properties described above for the chain in accordance with the present disclosure. However, the chain may also have one or more of the possible features and properties described above for the chain in accordance with the present disclosure irrespective of whether a pulling device is provided or not.

Said serial arrangement may in particular comprise first and second links that follow one another in an alternating manner along the sequence of the links of the arrangement, wherein the first links are substantially of the same kind, in particular of the same construction, as one another and the second links are substantially of the same kind, in particular of the same construction, as one another, and wherein the first links differ from the second links.

Furthermore, the links of the arrangement in the compact storage configuration, which are coupled to a respective preceding link via a respective articulated joint, are pivoted in an alternating manner in a first pivot direction and in a second pivot direction opposite to the first pivot direction relative to the respective preceding link about the joint axis of the respective articulated joint.

Furthermore, each of the links of the arrangement may comprise two respective link plates that are arranged offset from one another along the normal direction, wherein each of the two link plates extends from a first end of the respective link, at which the articulated joint is possibly configured for coupling to the link preceding the respective link, to a second end of the respective link which is opposite to said first end and at which the articulated joint is possibly configured for coupling to the link following the respective link.

In this respect, the links of the arrangement may alternately have a larger spacing and a smaller spacing between their two respective link plates. Furthermore, the spacing between the two link plates may be larger at the first end of the respective link than at the second end of the respective link. Furthermore, provision may also be made that both the spacing between the two link plates of a respective link and the spacing between the first end and the second end of the respective link either continuously decreases or continuously increases along the sequence of the links of the arrangement.

Furthermore, the articulated joints may each comprise a pin, which is formed at the one link coupled by the respective articulated joint, and a sleeve which is formed at the other link coupled by the respective articulated joint and which is engaged through by the pin such that said sleeve is pivotable about the pin.

In addition, the chain may comprise a hose-like jacket that envelops the arrangement from its first end up to its second end both in the compact storage configuration and in an extended longitudinal configuration of the arrangement in which the first end of the arrangement and the second end of the arrangement are spaced apart from one another at a maximum.

Furthermore, the chain may comprise a fixing device for fixing the arrangement in the compact storage configuration.

In addition, the chain may comprise a further serial arrangement of consecutive links that may be folded into a compact storage configuration in which, at each articulated joint, the one respective link of the further arrangement is coupled to a link of the further arrangement preceding it, the respective link is pivoted relative to the link preceding it about the respective joint axis to such an extent that the respective link and the link preceding it enclose the smallest possible angle within the framework of their relative pivotability, wherein the links of the further arrangement at least partly adopt the same position along the normal direction, and wherein the two arrangements are coupled to one another in an articulated manner such that, when they are each folded into their compact storage configuration, they can be arranged offset in parallel from one another, in particular adjacent to one another.

BRIEF DESCRIPTION OF THE DRAWINGS

The present disclosure will be further explained in the following by way of example with reference to the Figures.

FIG. 4 shows, in a simplified schematic representation, a second embodiment of a chain in accordance with the present disclosure or the chain of a second embodiment of a chain lock in accordance with the present disclosure in a view from the side, wherein the chain adopts an extended longitudinal configuration;

FIG. 5 shows, in a simplified schematic representation, the same chain in a view from above, wherein the chain adopts the extended longitudinal configuration;

FIG. 6 shows, in a simplified schematic representation, the same chain in a view from above, wherein the chain adopts a compact storage configuration;

DETAILED DESCRIPTION

Figure 1:
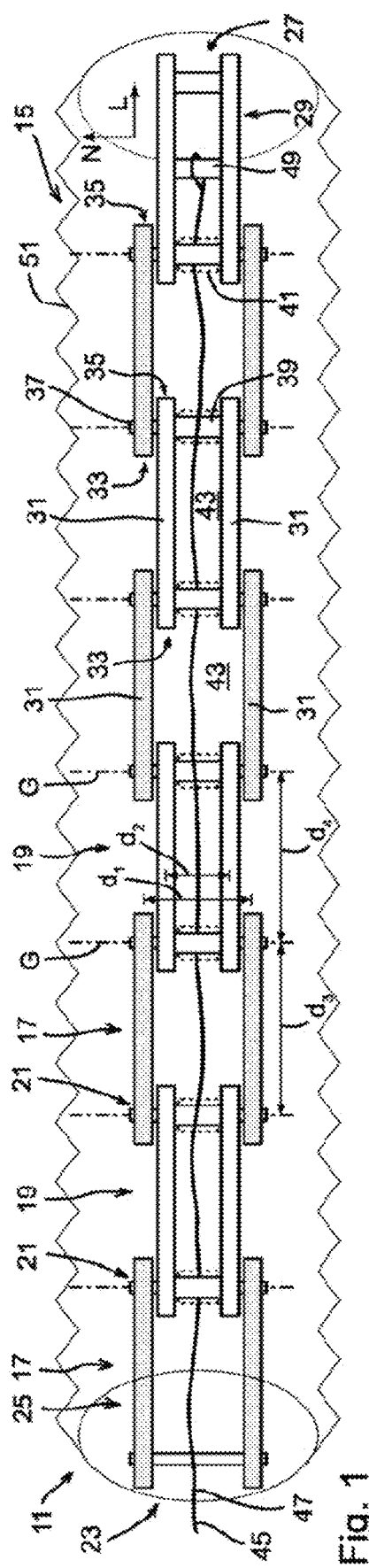
FIG. 1 shows, in a simplified schematic representation, a first embodiment of a chain in accordance with the present disclosure or the chain of a first embodiment of a chain lock in accordance with the present disclosure in a view from the side, wherein the chain adopts an extended longitudinal configuration.

In the Figures, different embodiments of chains 11 in accordance with the present disclosure or of chain locks 13 in accordance with the present disclosure are shown. In this respect, in the different embodiments, mutually corresponding elements are each marked by the same reference numeral, even if they may not be of the same kind under certain circumstances.

Figure 2:
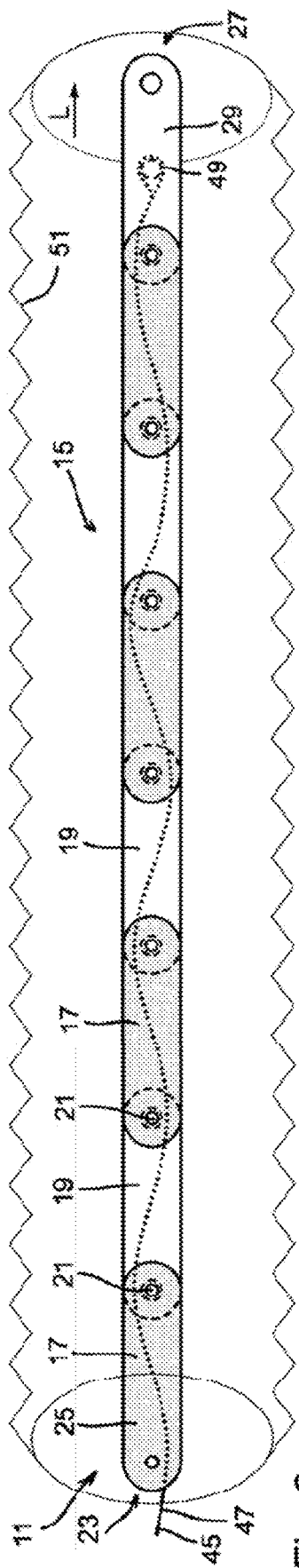
FIG. 2 shows, in a simplified schematic representation, the same chain in a view from above, wherein the chain adopts the extended longitudinal configuration.
Figure 3:
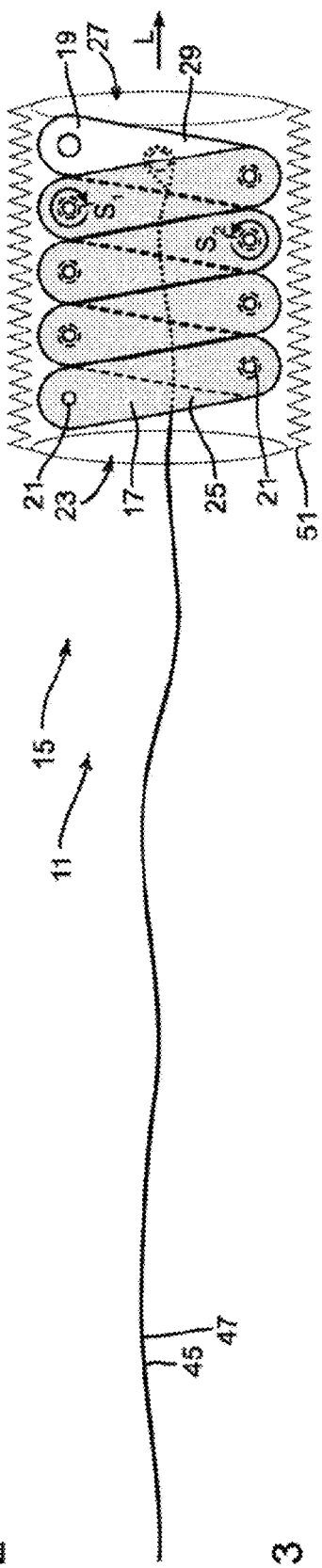
FIG. 3 shows, in a simplified schematic representation, the same chain in a view from above, wherein the chain adopts a compact storage configuration.

In FIGS. 1 to 3, a first embodiment of a chain 11 in accordance with the present disclosure is shown that is also part of a first embodiment of a chain lock 13 in accordance with the present disclosure. The chain 11 comprises a serial arrangement 15 of first links 17 and second links 19 that follow one another in an alternating manner, that are coupled to one another via an articulated joint 21 between one another in each case, and that are pivotable relative to one another about a joint axis G, which is parallel to a normal direction N, of the articulated joint 21 in each case. In this respect, the arrangement 15 extends from a first end 23 at which the arrangement 15 has a first end link 25 up to a second end 27 at which the arrangement 15 has a second end link 29. Therebetween, the arrangement 15 has a structure having a repeating pattern of a plurality of mutually corresponding sub-units that each comprise a first link 17 and a second link 19.

For the sake of clarity, not all the first and second links 17, 19, not all the articulated joints 21, and not all their respective elements are provided with reference numerals, but in each case only one or a few of a plurality of identical or mutually corresponding elements are provided with a reference numeral by way of example. It is understood that the same reference numeral in each case also refers to the other identical or corresponding elements.

In this respect, the chain 11 is in particular shown simplified in that only a part of the chain 11 comprising the arrangement 15 is shown and the arrangement 15 is also shown reduced to comparatively few links 17, 19 to illustrate the general structure of the arrangement 15. In fact, the arrangement 15 has substantially more first and second links 17, 19 such that the repeating pattern, which in each case comprises a first link 17 and a second link 19, repeats substantially more often than shown. Beyond the ends 23, 27 of the arrangement 15, the chain 11 may continue even further. Elements for fastening and/or locking a respective end of the chain 11 may, for example, in particular be provided at an object or at a lock body of the chain lock 13, but are not shown here.

The first links 17 of the serial arrangement 15, which also include the first end link 25, are of the same construction as one another. With the exception of the second end link 29, which is one of the second links 19, the second links 19 of the serial arrangement 15 are also of the same construction as one another.

The first and second links 17, 19 each comprise two flat elongate link plates 31 that each extend from a first end 33 to a second end 35 of the respective link 17, 19, that are oriented perpendicular to the normal direction N, and are thus aligned parallel to one another, and that are arranged offset from one another along the normal direction N. (The link plates 31 of the first links 17 are in this respect shown slightly darker than the link plates 31 of the second links 19 for better differentiation.) The spacing $d_1$ between the two link plates 31 of a respective first link 17 is in this respect larger than the spacing $d_2$ between the two link plates 31 of a respective second link 19, wherein in each case the mean spacing between the center planes of the two link plates 31 is meant here.

Because the spacing $d_1$ differs from the spacing $d_2$ by more than twice the thickness of a respective link plate 31, which is substantially identical for all the link plates 31, the first ends 33 of the second links 19 may be arranged between the second ends 35 of the first links 17 and the second ends 35 of the second links 19 may be arranged between the first ends 33 of the first links 17 to be coupled to one another by way of a respective articulated joint 21.

In this respect, the articulated joints 21 each comprise a pin 37, which is aligned parallel to the normal direction N and which connects the link plates 31 of the first link 17 coupled by the respective articulated joint 21 to one another, and a sleeve 39 that is aligned parallel to the normal direction N and that connects the link plates 31 of the second link 19 coupled by the respective articulated joint 21 to one another. In this respect, the pin 37 extends through the sleeve 39 such that the second link 19 may be pivoted with the sleeve 39 about the pin 37 and thus relative to the first link 17 about the joint axis G. In the embodiment shown in FIG. 1, the chain 11 is thus configured in the manner of a sleeve chain.

Another roller 41 may be rotatably supported around the sleeves 39 in each case. The optional rollers 41 in the embodiment shown are indicated by broken lines in FIG. 1. When the rollers 41 are provided, the chain 11 is configured in the manner of a roller chain type.

Along the sequence of first and second links 17, 19 of the serial arrangement 15, the joint axes G of consecutive articulated joints 21 each have the same spacing $d_3$ or $d_4$ from one another. This is, however, generally preferably not necessarily the case. The spacing $d_3$ or $d_4$ of the joint axes G of the two articulated joints 21 that couple a respective link 17, 19 to the link 17, 19 preceding it or following it corresponds substantially to the longitudinal extent of the respective link 17, 19 and does not necessarily have to be the same for the first links 17 as for the second links 19. Furthermore, the spacings $d_3$ and $d_4$ also do not necessarily have to be the same for all the first links 17 or for all the second links 19, but may also vary (cf. in this respect, for example, the fifth embodiment shown in FIGS. 10 to 12).

Each of the first and second links 17, 19 of the arrangement 15 has a passage opening 43 that is in each case formed by the free space between the two link plates 31 and the two ends 33, 35, in particular the articulated joints 21 provided at the ends 33, 35, and that may in particular be passed through perpendicular to the normal direction N and perpendicular to the longitudinal extent of the respective link 17, 19 (i.e. to the extent from its first end 33 to its second end 35), that is perpendicular to the image plane of FIG. 1.

The chain 11 further comprises a pulling device 45 having an elongate, rope-like pulling element 47 that is configured as a wire rope having a plastic jacket. One end of this pulling element 47 is fastened to the second end link 29 of the arrangement that for this purpose has a fastening element 49 that, in the exemplary embodiment shown, is arranged in a middle region of the longitudinal extent of the second end link 29 and is configured as a spoke connecting the two link plates 31 the spoke extending parallel to the normal direction N. From there, the pulling element 47 extends along the total arrangement 15 up to the first end link 25 and also extends beyond it to be able to be gripped. For this purpose, a gripping element may be provided at the free end of the pulling element 47, but is not shown.

In this respect, the pulling element 47 has a slalom-like course about the joint axes G of the articulated joints 21 because it extends in accordance with the sequence of the joint axes G along the arrangement 15 in an alternating manner in the one direction of rotation and in the other direction of rotation about a respective joint axis G. With respect to the viewing direction in FIG. 1, the pulling element 47 in this respect extends behind each joint axis G of an articulated joint 21 coupling a first link 17 to a subsequent second link 19 and in front of each joint axis G of an articulated joint 21 coupling a second link 19 to a subsequent first link 17. With respect to the viewing direction in FIGS. 2 and 3, the pulling element 47 extends starting from the first end 23 of the arrangement 15 in the direction of the second end 27 of the arrangement 15, in each case clockwise about each joint axis G of an articulated joint 21 coupling a first link 17 to a subsequent second link 19 and counterclockwise about each joint axis G of an articulated joint 21 coupling a second link 19 to a subsequent first link 17. In this respect, the course of the pulling element 47 in FIG. 3 also represents a slalom-like course with respect to the joint axes G even if the pulling element 47 may in this respect be stretched out in a straight manner.

As may in particular be seen in FIG. 1, the pulling element 47 in this respect extends through each of the passage openings 43 of the first and second links 17, 19 of the arrangement 15, wherein, starting from the first end 23 of the arrangement 15, the passage openings 43 of the first links 17 are each passed through in the one direction (into the image plane of FIG. 1) and the passage openings 43 of the second links 19 are each passed through in the opposite direction thereto (out of the image plane of FIG. 1).

In FIGS. 1 and 2, the arrangement 15 is shown in an extended longitudinal configuration in which the ends 23, 27 of the arrangement 15, which may have different spacings from one another due to the articulated connection of the first and second links 17, 19, are spaced apart from one another at a maximum. The joint axes G of the articulated joints 21 are in this respect arranged in a plane that is parallel to the image plane of FIG. 1. In this respect, the arrangement 15 extends from its first end 33 to its second end 35 along a longitudinal direction L perpendicular to the normal direction N just as all of its first and second links 17, 19 extend from their respective first ends 33 to their respective second ends 35 along a longitudinal direction L perpendicular to the normal direction N. In other words, the longitudinal extents of all the first and second links 17, 19 of the arrangement 15 are aligned parallel to the longitudinal direction L. Furthermore, the joint axes G of all the articulated joints 21 are disposed in a plane parallel to the normal direction N and with the longitudinal direction L.

In FIG. 3, the arrangement 15 is, in contrast, shown in its compact storage configuration in which each of the first links 17 of the arrangement 15 is pivoted relative to the second link 19 preceding it (with the exception of the first end link 25 which is not preceded by a second link 19) in a first pivot direction $S_1$ at a maximum about the respective joint axis G and each of the second links 19 of the arrangement 15 is pivoted relative to the first link 17 preceding it in an opposite second pivot direction $S_2$ at a maximum about the respective joint axis G. With respect to the viewing direction in FIG. 3, the first pivot direction $S_1$ corresponds to the clockwise direction and the second pivot direction $S_2$ corresponds to the counterclockwise direction.

As may be seen in FIG. 3, in the compact storage configuration, all the first links 17 of the arrangement 15 are aligned parallel to one another with respect to their longitudinal extent from their respective first end 33 to their respective second end 35 and contact one another laterally, i.e. transversely to this longitudinal extent. In a corresponding manner, all the second links 19 of the arrangement 15 are aligned parallel to one another with respect to their longitudinal extent from their respective first end 33 to their respective second end 35 and contact one another laterally, i.e. transversely to this longitudinal extent.

In the compact storage configuration, the longitudinal direction L along which the arrangement 15 extends may be defined as the direction in which the first links 17 are arranged offset from one another and in which the second links 17 are arranged offset from one another, and/or as the direction along which the joint axes G of the articulated joints 21 which each couple a first link 17 to a second link 19 following it are arranged offset from one another, or along which the joint axes G of the articulated joints 21 which each couple a second link 19 to a first link 17 following it are arranged offset from one another. Relative to this direction, the direction in which the longitudinal extents of the first links 17 are aligned and the direction in which the longitudinal extents of the second links 19 are aligned have the same angle in terms of magnitude, but with a different sign. The angle that is enclosed at a respective articulated joint 21, or defined, by the two links 17, 19 that are coupled to one another via this articulated joint is in this respect of the same magnitude at all the articulated joints 21 and, because the links 17, 19 may not be pivoted more toward one another, is as small as possible. In the exemplary embodiment shown, this angle amounts to 20°.

The serial arrangement 15 may be brought from the extended longitudinal configuration or another adopted configuration into the compact storage configuration by pulling the free end of the pulling element 47, which is not connected to the fastening element 49, relative to the first end 23 of the arrangement 15, which may have to be fixedly held, such that the second end 27 of the arrangement 15 is pulled toward the first end 23 of the arrangement 15. This may, for example, also take place wherein the free end of the pulling element 47 is fixedly held and the first end 23 of the arrangement 15 is dropped onto the second end 27 of the arrangement 15. Due to the pulling element 43, in particular due to its slalom-like course, the links 17, 19 of the arrangement 15 are in this respect guided such that each first link 17 (with the exception of the first end link 25) is pivoted in the first pivot direction $S_1$ relative to the respective second link 19 preceding it and each second link 19 is pivoted in the opposite second pivot direction $S_2$ relative to the respective first link 17 preceding it until all the links 17, 19 are pivoted to the maximum and the compact storage configuration is thus achieved.

Alternatively to the pulling element 47 having a free end, the pulling element 47 could also be fastened to the first end link 25 and be elastic in order to permanently preload the first end 23 of the arrangement 15 toward the second end 27 of the arrangement 15 and thus to always preload the arrangement 15 into the compact storage configuration.

The chain 11 further comprises a hose-like jacket 51 that envelops the arrangement 15 from its first end 23 up to its second end 27 both in the extended longitudinal configuration and in the compact storage configuration. The jacket 51 may be folded in the manner of a bellows and is configured to always adopt a length corresponding to the respective longitudinal extent of the arrangement 15. For this purpose, the ends of the jacket 51 may each be connected to the corresponding end 23, 27 of the arrangement 15. The arrangement 15 may then also be able to be brought into its compact storage configuration by folding the jacket 51. In addition, the jacket 51 may be elastic, in particular such that it is preloaded in the direction of the state shown in FIG. 3 and thus preloads the arrangement 15 into the compact storage configuration. In this respect, the jacket 51 may act as part of the pulling device 45 and the pulling element 47 could also be omitted.

The second embodiment of a chain 11 in accordance with the present disclosure shown in FIGS. 4 to 6, which is simultaneously a part of a second embodiment of a chain lock 13 in accordance with the present disclosure, corresponds to a large extent to the chain 11 in accordance with the first embodiment shown in FIGS. 1 to 3, wherein the representations of FIGS. 4 to 6 also correspond to the representations of FIGS. 1 to 3. For this reason, only the differences of the second embodiment in comparison with the first embodiment will be discussed in the following.

The main difference lies in the fact that, in the second embodiment, the pulling device 45 comprises two pulling elements 47, 48, which are each elongate and rope-like, and in the manner in which the pulling elements 47, 48 extend guided along the arrangement 15. The one pulling element 47 connects all the articulated joints 21 that each couple a first link 17 to a second link 19 of the arrangement 15 preceding it while the other pulling element 48 connects all the articulated joints 21 that each couple a second link 19 to a first link 17 of the arrangement 15 preceding it. For this purpose, a respective guide element 53 in the form of an eyelet, through which the one or the other of the two pulling elements 47, 48 extends depending on the articulated joint 21, is formed at the articulated joints 21 and additionally at the first end 33 of the first end link 25 and the second end 35 of the second end link 29 of the arrangement 15.

In the embodiment shown, the guide elements 53 that are passed through by the one pulling element 47 and the guide elements 53 that are passed through by the other pulling element 48 are provided at different sides of the arrangement 15 with respect to the normal direction N. For this reason, in FIGS. 5 and 6, one of the pulling elements 48 extends partly behind the links 17, 19 of the arrangement 15 and is therefore partly shown as a broken line. However, the guide elements 53 could also all be provided at the same side of the arrangement 15.

By pulling at the pulling elements 47, 48, the articulated joints 21 that each couple a first link 17 to a second link 19 of the arrangement 15 following it may be pulled toward one another and the articulated joints 21 that each couple a second link 19 to a first link 17 of the arrangement 15 following it may be pulled toward one another, whereby each first link 17 is pivoted in the first pivot direction $S_1$ relative to the respective second link 19 preceding it and each second link 19 is pivoted in the second pivot direction $S_2$ relative to the respective first link 17 preceding it. Thus, the arrangement 15 may also be brought into the compact storage configuration by way of such a pulling device 45 comprising two pulling elements 47, 48.

In contrast to the two embodiments explained above, the third embodiment shown in FIG. 7 of a chain 11 in accordance with the present disclosure or a chain 11 of a third embodiment of a chain lock 13 in accordance with the present disclosure not only has the aforementioned arrangement 15, but also a further serial arrangement 55 of first links 17 and second links 19 that follow one another in an alternating manner. In this respect, the two arrangements 15, 55 are substantially of the same kind. Moreover, their respective design substantially corresponds to that of the respective arrangement 15 of the first and second embodiments, wherein more first and second links 17, 19 of the respective arrangement 15, 55 are shown in the third embodiment. Both arrangements 55 may in particular each be folded independently of one another into a compact storage configuration in which each of the first links 17 of the respective arrangement 15 or 55 is pivoted relative to the second link 19 preceding it in a first pivot direction $S_1$ at a maximum about the respective joint axis G and each of the second links 19 of the respective arrangement 15 or 55 is pivoted relative to the first link 17 preceding it in a second pivot direction $S_2$ opposite to said first pivot direction $S_1$ at a maximum about the respective joint axis G. As in the case shown, the first and second pivot directions $S_1$, $S_2$ may in this respect be oriented differently for the two arrangements 15, 55, in particular just the opposite when the joint axes G of the two arrangements 15, 55 are parallel to one another.

The second end links 29 of the two arrangements 15, 55 are coupled in an articulated manner to one another via a connection link 57. Similarly to the first and second links 17, 19, the connection link 57 comprises two link plates 31 that extend from a first end 33 to a second end 35 of the connection link 57, that are oriented perpendicular to the normal direction N and thus parallel to one another, and that are arranged offset from one another along the normal direction N. The spacing between the two link plates 31 corresponds to the spacing $d_1$ between the link plates 31 of a respective first link 17.

The second end 35 of the second end link 29 of the one arrangement 15 and the first end 33 of the connection link 57 are coupled to one another via an articulated joint 21. In a corresponding manner, the second end 35 of the second end link 29 of the further arrangement 55 and the second end 35 of the connection link 57 are coupled to one another via an articulated joint 21. The joint axes G of these articulated joints 21 are in this respect aligned parallel to the normal direction N. In other respects, these articulated joints 21 also substantially correspond to the articulated joints 21 between a respective first link 17 and a respective second link 19 of the arrangements 15, 55.

Figure 7:
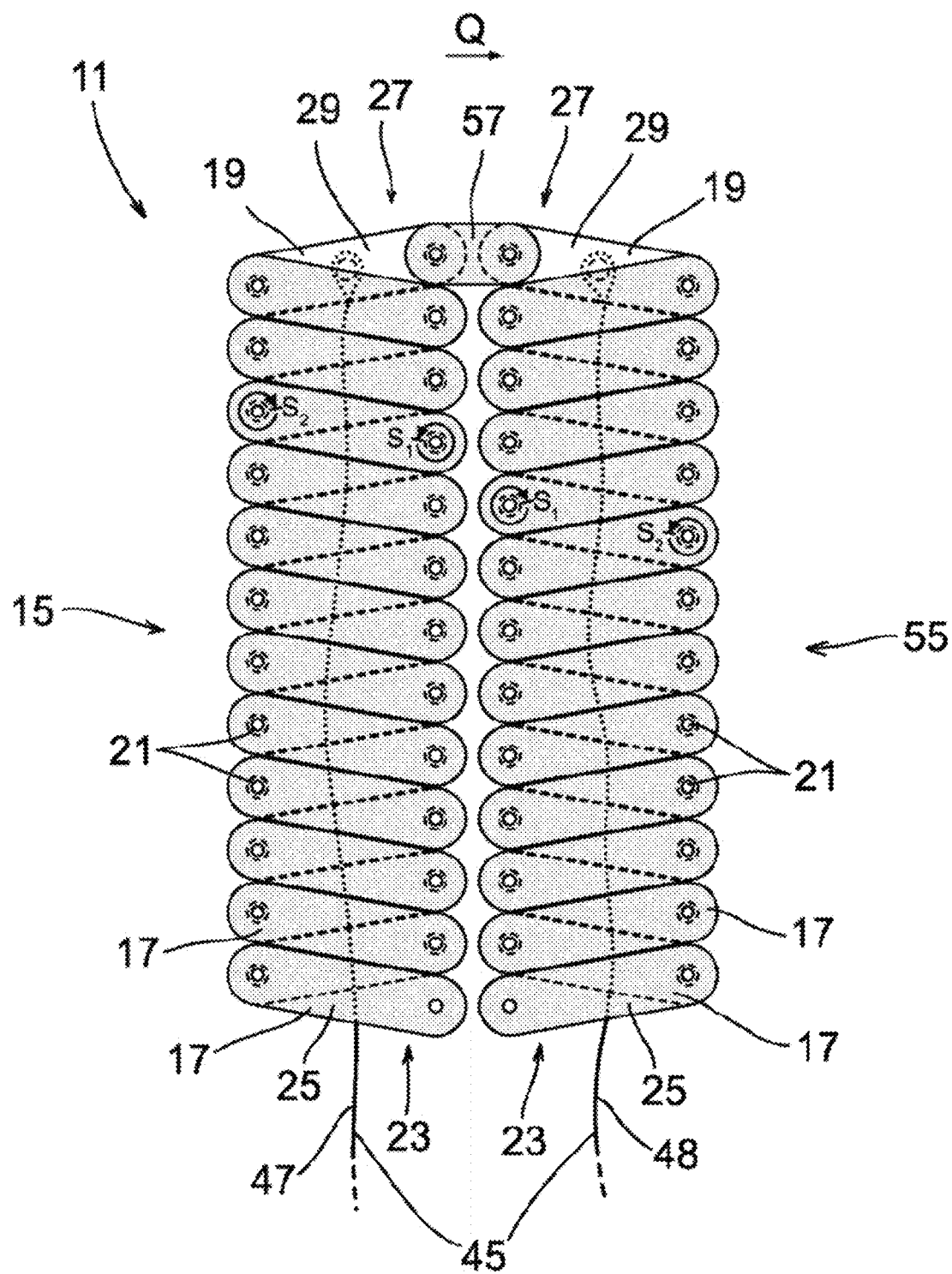
FIG. 7 shows, in a simplified schematic representation, a third embodiment of a chain in accordance with the present disclosure or the chain of a third embodiment of a chain lock in accordance with the present disclosure, in a view from above, wherein the chain adopts a compact storage configuration.

At the two arrangements 15, 55, a respective pulling element 47, 48 is provided which is part of a common pulling device 45 of the chain 11 and by way of which the respective arrangement 15 or 55 may be brought into their compact storage configuration. In this respect, the articulated coupling of the two arrangements 15, 55 to one another makes it possible, as shown in FIG. 7, to fold the arrangements 15, 55 into their compact storage configuration in each case and to arrange them parallel to and adjacent to one another. In the embodiment shown, the two arrangements 15, 55 are arranged adjacent to one another in a transverse direction Q perpendicular to the normal direction N (that is oriented perpendicular to the image plane of FIG. 7). However, depending on the design of the articulated coupling between the two arrangements 15, the arrangements 15, 55 may also be arranged adjacent to one another along the normal direction N. In this respect, the adjacent arrangement of a plurality of arrangements 15, 55 folded into their compact storage configuration enables the chain 11 to be folded in a particularly compact manner in a defined manner overall.

Instead of the two pulling elements 47, 48, the pulling device 45 could also comprise only a single pulling element 47 by way of which both arrangements 15, 55 may be folded into their respective storage configuration; furthermore, a specially configured link 57 does not have to be provided for the articulated coupling of the two arrangements 55 because the coupling may also take place by way of one or more links 17, 19 that are formed in correspondence with the links 17, 19 of the two arrangements 15, 55. This is illustrated by the fourth embodiment shown in FIG. 8, which differs from the third embodiment shown in FIG. 7 in just these aspects, but otherwise largely corresponds to the third embodiment. In the fourth embodiment, the second end link 29 of the arrangement 15 and the second end link 29 of the further arrangement 55 are in particular connected in an articulated manner via two links, one of which corresponds to a first link 17 of the arrangements 15, 55 and the other of which corresponds to a second link 19 of the arrangements 15, 55.

It may also be seen from the fourth embodiment that the pulling device 45 does not necessarily have to be fastened to the two mutually coupled ends 27 of the arrangements 15, 55 to be able to pull the ends 23, 27 of a respective arrangement 15, toward one another by way of the pulling device 45. For in order to bring the two arrangements 15, 55 into their respective storage configuration by way of the pulling device 45, it may, for example, be sufficient to fixedly hold the two ends of the pulling element 47 of the pulling device 45 and to allow the two arrangements 15, 55 to fall downwardly with the two mutually coupled ends 27 at the front.

Figure 8:
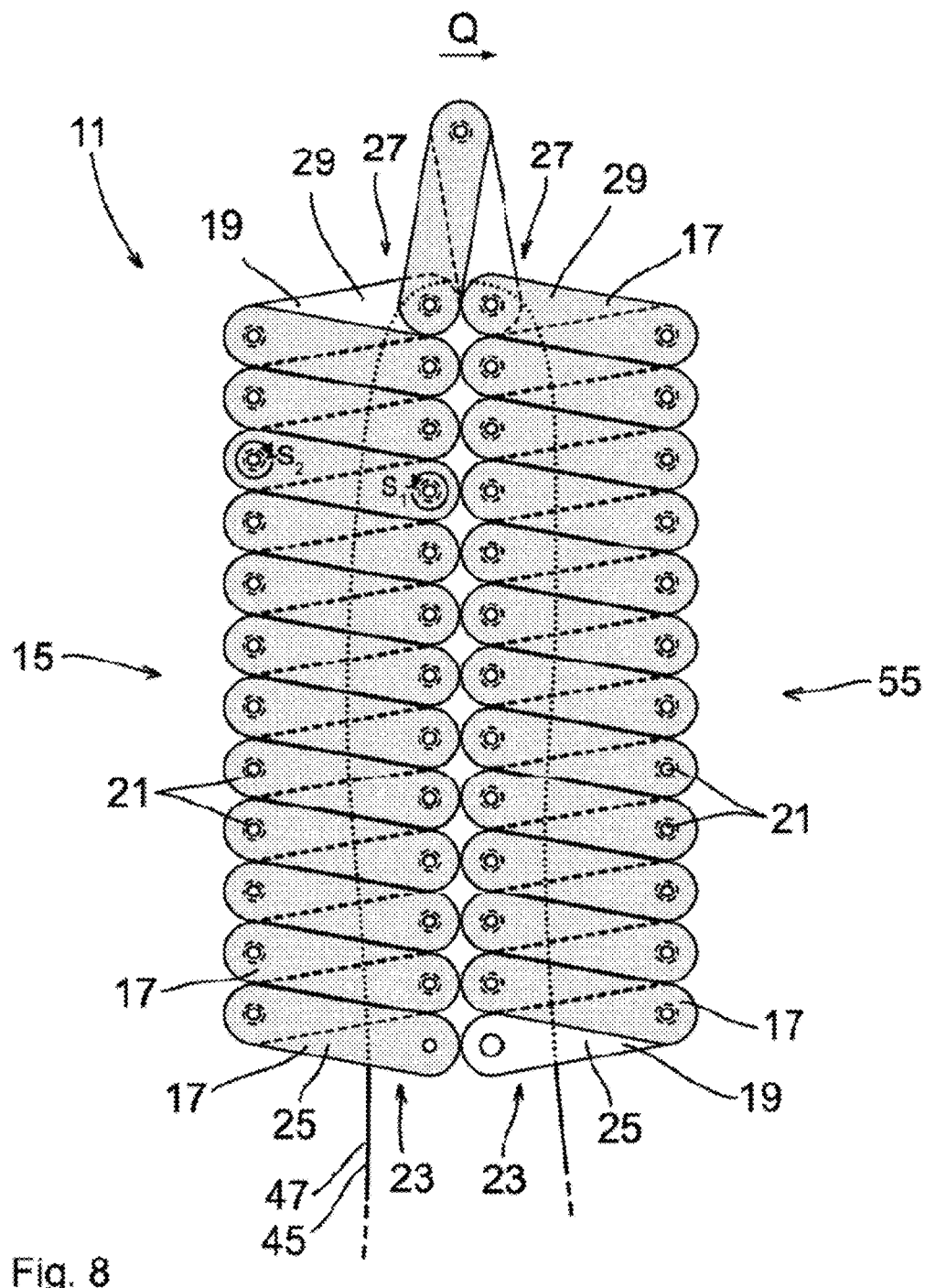
FIG. 8 shows, in a simplified schematic representation, a fourth embodiment of a chain in accordance with the present disclosure or the chain of a fourth embodiment of a chain lock in accordance with the present disclosure in a view from above, wherein the chain adopts a compact storage configuration.
Figure 9:
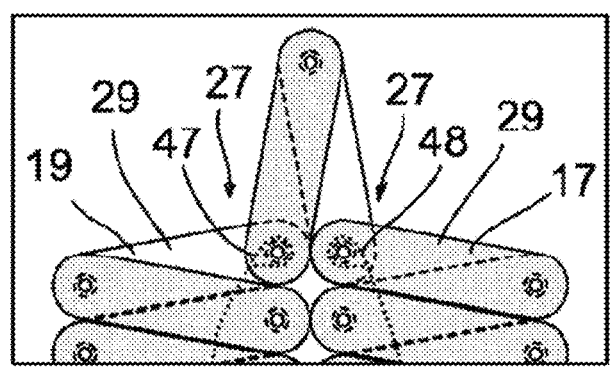
FIG. 9 shows, in a simplified schematic representation, a section of a further variant of the fourth embodiment.

FIG. 9 shows a variant of the fourth embodiment, wherein only one section is shown in which the difference from the embodiment shown in FIG. 8 may be seen. In the variant shown in FIG. 9, the pulling device 45 does not comprise a single continuous pulling element 47, but, similarly to the third embodiment, rather comprises two pulling elements 47, 48. In this respect, the one pulling element 47 extends along the one serial arrangement 15 of consecutive links 17, 19 and the further pulling element 48 extends along the further arrangement 55 of consecutive links 17, 19. In this way, the two arrangements 15, 55 may be folded into their respective compact storage configurations generally independently of one another by way of the respective pulling element 47, 48. However, to fasten the pulling elements 47, 48 to the second end 27 of the respective arrangement 15, 55, the second end links 29 in this variant do not have a separate fastening element 49 unlike in the third embodiment. Rather, the pulling elements 47, 48 are each fastened to the articulated joint 21 that couples the second end link 29 to one of the two links via which the two arrangements 15, 55 are coupled in an articulated manner to one another. Apart from these differences, the variant shown in FIG. 9 corresponds to the fourth embodiment shown in FIG. 8.

Figure 10:
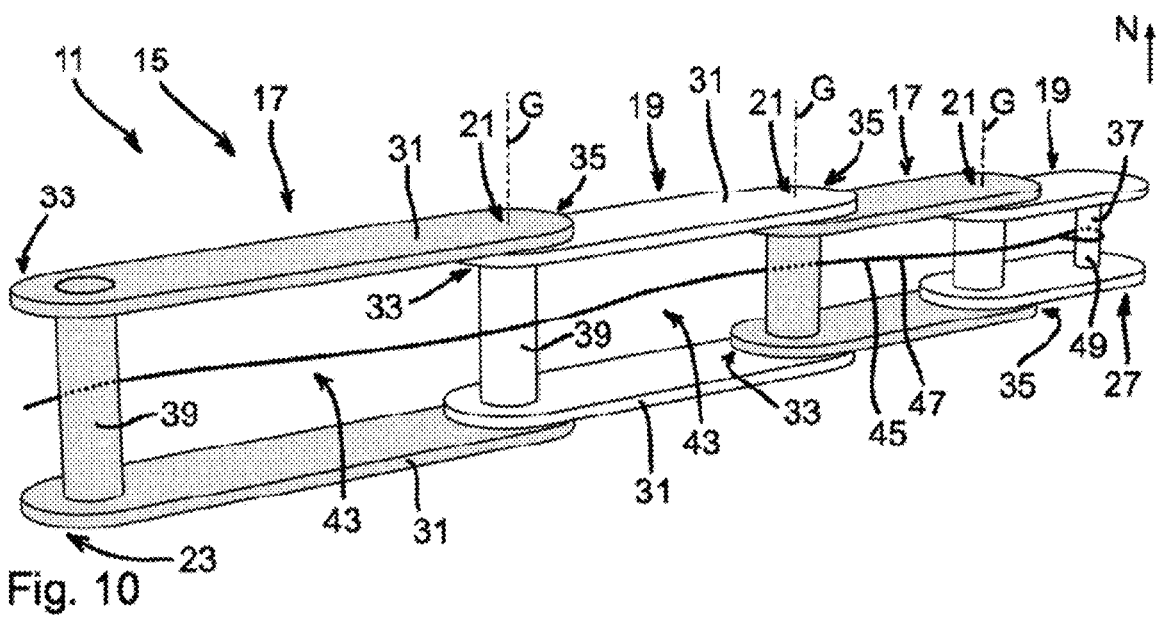
FIGS. 10 to 12 each show, in a simplified schematic representation, a fifth embodiment of a chain in accordance with the present disclosure or the chain of a fifth embodiment of a chain lock in accordance with the present disclosure in a perspective view, wherein the chain adopts an extended longitudinal configuration (FIG. 10), an intermediate position (FIG. 11), and a compact storage configuration (FIG. 12)
Figure 11:
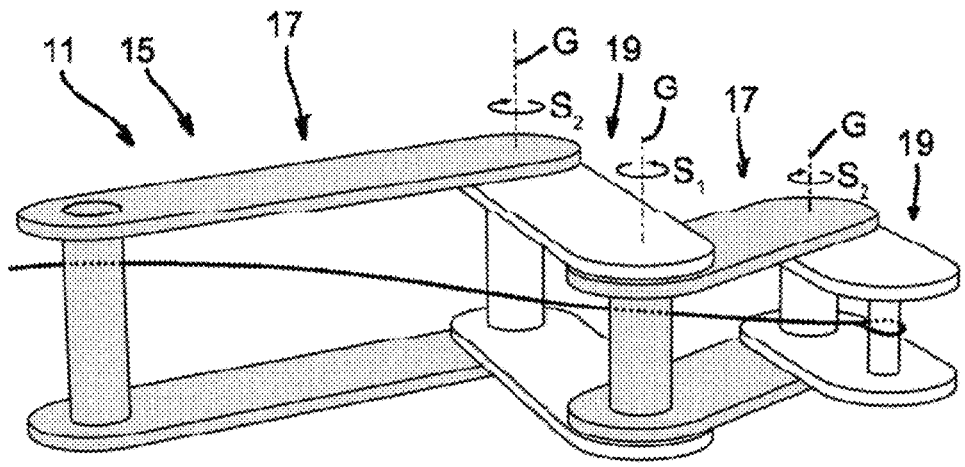
Figure 12:
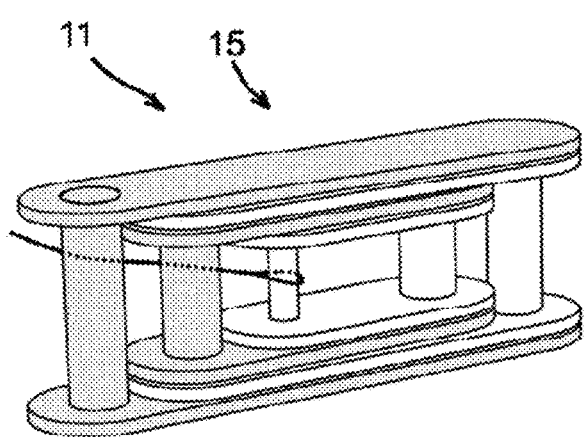

In FIGS. 10 to 12, a fifth embodiment of a chain 11 in accordance with the present disclosure is shown, which at the same time is part of a fifth embodiment of a chain lock 13 in accordance with the present disclosure, wherein again for better clarity in each case only one or a few of a plurality of identical or mutually corresponding elements are provided with a reference numeral by way of example and reference numerals are largely omitted in FIG. 11 and in particular in FIG. 12 that show the same elements as FIG. 10 only in a different position. Furthermore, similarly to in FIGS. 1 to 6, only a single serial arrangement 15 of consecutive links 17, 19 of the chain 11 is shown. In this respect, the links 17, 19 may be distinguished as first links 17 and second links 19 in accordance with their position within the arrangement 15 and are coupled to one another via articulated joints 21 such that they may each be pivoted relative to one another about a joint axis G, which is parallel to a normal direction N, of the respective articulated joint 21. In this respect, the links 17, 19 may also otherwise be formed in a manner substantially corresponding to the four preceding embodiments. The links 17, 19 in particular each have two flat elongate link plates 31 that are oriented perpendicular to the normal direction N and that are arranged offset from one another along the normal direction N.

The arrangement 15 extends from a first end 23 up to a second end 27, wherein, to simplify the illustration, the arrangement 15 is shown reduced to comparatively few links 17, 19 that illustrate the general design of the arrangement 1. A particular feature of the fifth embodiment, by which this embodiment differs from the preceding embodiments, is that both the spacing between the two link plates 31 of a respective link 17, 19 and the longitudinal extent, i.e. the spacing between the first end 33 and the second end 35, of the respective link 17, 19 decreases along the sequence of links 17, 19 along the arrangement 15 from the link 17, 19 to the link 17, 19.

For the articulated coupling of the links 17, 19 to one another, the links 17, 19 each have a sleeve 39 at their first end 33 and a pin 37 at their second end 35 that each connect the two link plates 31 of the respective link 17, 19 parallel to the normal direction N. In this respect, the pin 37 at the second end 35 of a respective link 17, 19 engages through the sleeve 39 at the first end 33 of the link 17, 19 following the respective link 17, 19 such that the pin 37 is not visible in FIGS. 10 to 12 for most of the links 17, 19. Only the pin 37 of the last link 17, 19 of the arrangement 15 does not engage through a sleeve 39. This pin 37 may therefore be used as a fastening element 49 for fastening the pulling element 47 of the pulling device 45.

The pulling element 47 extends along the total arrangement 15 and in this respect extends past each link 17, 19 of the arrangement 15 through a passage opening 43 of the respective link 17, 19 that is formed between the two link plates 31 of the respective link 17, 19 and between the first end 33 and the second end 35 of the respective link 17, 19. The passage openings 43 are in this respect passed through in an alternating manner from different directions such that the pulling element 47 has a slalom-like course about the joint axes G of the articulated joints 21.

In FIG. 10, the arrangement 15 adopts an extended longitudinal configuration in which the joint axes G of all the articulated joints 21 that couple two links 17, 19 of the arrangement 15 are disposed within a plane. In particular due to said slalom-like course of the pulling element 47, a pulling at the free end of the pulling element 47 causes the links 17, 19 to pivot, depending on their respective position within the arrangement 15, either in the one or the other pivot direction relative to the respective preceding link 17, 19 about the joint axis G of the respective articulated joint 21 such that all the first links 17 are pivoted in the first pivot direction $S_1$ relative to the respective preceding link 17, 19 and all the second links 19 are pivoted in the second pivot direction $S_2$, which is opposite to the first pivot direction $S_1$, relative to the respective preceding link 17, 19. The arrangement 15 may thereby be moved from the extended longitudinal configuration into, for example, the intermediate position shown in FIG. 11.

Due to a further pulling, the arrangement 15 may finally be brought into a position in which the links 17, 19 are arranged nested within one another because each of the links 17, 19 is arranged within, i.e. between the link plates 31, of the link 17, 19 preceding it and is in this respect arranged antiparallel thereto, or overlapping, such that it encloses an angle of 0° with the link 17, 19 preceding it at the joint axis G of the articulated joint 21 coupling the two links 17, 19 to one another. This position shown in FIG. 12, in which the links 17, 19 of the arrangement 15 are nested within one another, thus represents the compact storage configuration of the arrangement 15.

In general, the links 17, 19 may be freely pivotable, i.e. pivotable by 360° and beyond, relative to the respective preceding link 17, 19 about the joint axis G of the respective articulated joint such that they may also be pivoted beyond the position shown in FIG. 12 through the passage opening 43 of the respective next-larger link 17, 19 within which they are arranged in the compact storage configuration. In such a case, a user of the chain lock 13 may, for example, hold the largest of the links 17, 19 with one hand such that the remaining links 17, 19, which are pulled into the compact storage configuration by pulling the pulling element 47 with the other hand, are prevented by the one hand from being pivoted beyond the largest link 17, 19. It is further conceivable that an abutment is formed at each of the links 17, 19 or a blocking mechanism is formed in each of the articulated joints 21, said blocking mechanism blocking a pivoting of the respective following link 17, 19 beyond the antiparallel alignment, in which the two links 17, 19 enclose, or define, an angle of 0°, such that the links 17, 19 may be pivoted in the respective pivot direction at most up to and into the position shown in FIG. 12. In this way, the arrangement 15 may be reliably brought into the compact storage configuration by pulling at the pulling element 43.

In FIGS. 13 to 20, different alternative embodiment possibilities of the links 17, 19 of the serial arrangement 15 of a respective chain 11 in accordance with the present disclosure or of the chain 11 of a chain lock 13 in accordance with the present disclosure are shown. Even though the arrangement 15 may in each case have substantially more links 17, 19, in this respect only a respective four links 17, 19 are shown, which may again be distinguished as two first links 17 and two second links 19 in accordance with their sequence, as well as the articulated joints 21 coupling these links 17, 19 to one another. The articulated joints 21 are in this respect each represented in simplified form by a vertical line that is aligned parallel to the normal direction N and that simultaneously corresponds to the joint axis G of the respective articulated joint 21.

The links 17, 19 are represented by horizontal lines that each correspond to a longitudinal element of the respective link 17, 19. These longitudinal elements may in particular each correspond to a link plate 31, but do not necessarily have to be configured as a link plate 31. However, the longitudinal elements have the common feature that they each extend along the total longitudinal extent of the respective link 17, 19, i.e. from its first end 33 up to its second end 35. Furthermore, the longitudinal elements of a respective link 17, 19 are arranged offset from one another along the normal direction N and may in particular be aligned parallel to one another and/or oriented perpendicular to the normal direction N.

While the links 17, 19 may generally each have even further elements, for example guide elements 53 for a pulling element 47 of the pulling device 45 of the respective chain 11, the basic structure of the links 17, 19 is in each case at least substantially formed by the longitudinal elements shown as a respective line. Provision may in particular be made that the links 17, 19 each have no further elements extending along the total longitudinal extent of the respective link 17, 19.

Figure 13:
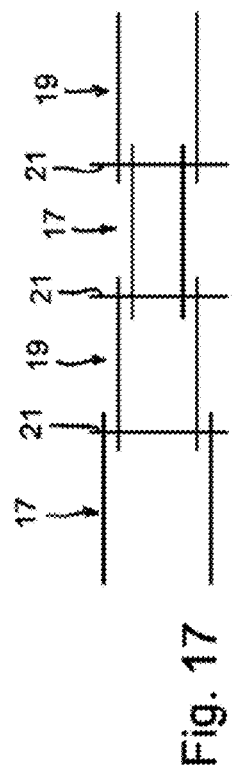
FIGS. 13 to 20 each show, in a highly simplified schematic representation, some links of a respective arrangement of different embodiments of a chain in accordance with the present disclosure or of a chain of different embodiments of a chain lock in accordance with the present disclosure.

In the embodiment shown in FIG. 13, the first links 17 each comprise two longitudinal links, while the second links 19 each comprise only one longitudinal link. In this respect, the chain 11 may, for example, be configured as a pin chain, in particular a block chain.

Figure 14:
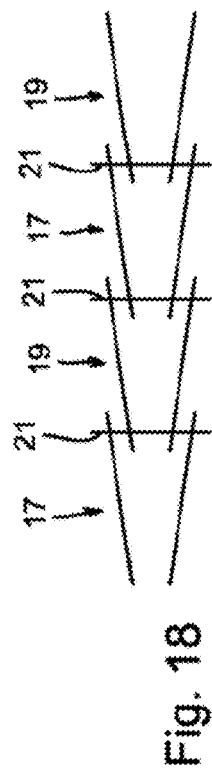

In the embodiment shown in FIG. 14, both the first links 17 and the second links 19 each comprise two longitudinal elements that, in the case of the second links 19, are spaced less widely apart from one another along the normal direction N than the longitudinal elements of the first links 17. The links 17, 19 may, for example, be formed in a corresponding manner as in the first, second, third, or fourth embodiments. The chain 11 may in particular be a sleeve chain or a roller chain.

Figure 15:
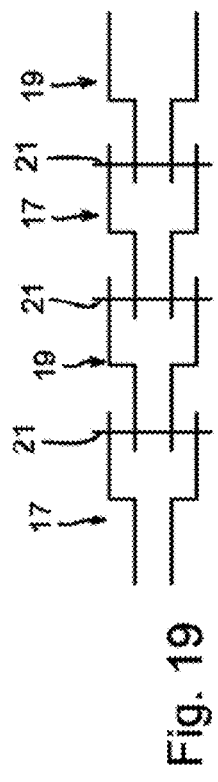

Also in the embodiment shown in FIG. 15, both the first links 17 and the second links 19 each comprise two longitudinal elements. However, this embodiment is an example of the fact that the two longitudinal elements of the first links 17 may generally also have the same spacing from one another as the longitudinal elements of the second links 19. In this embodiment, all the links 17, 19 of the arrangement 15 may in particular be substantially of the same construction.

Figure 16:
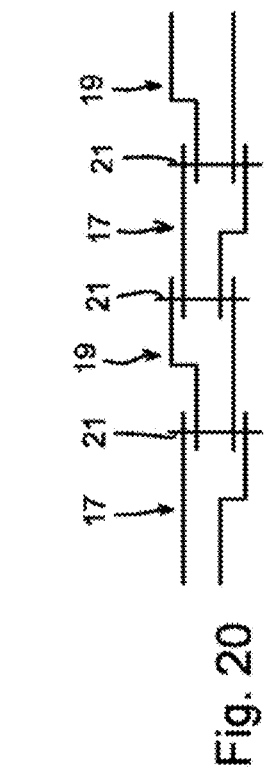

In the embodiment shown in FIG. 16, the first links 17 each comprise four longitudinal elements and the second links 19 each comprise three longitudinal elements that each alternate along the normal direction N in the region of their overlap at the articulated joints 21. In this respect, the two outermost longitudinal elements of the first links 17 along the normal direction N are spaced further apart from one another than the two outermost longitudinal elements of the second links 19 along the normal direction N. The chain may in particular be configured in the manner of a leaf chain. In general, the first and second links 17, 19 may have even more longitudinal elements. In this respect, it is preferred if the second links 19 each comprise one fewer longitudinal element than the first links 17 or the first and second links 17, 19 comprise the same number of longitudinal elements.

Figure 17:
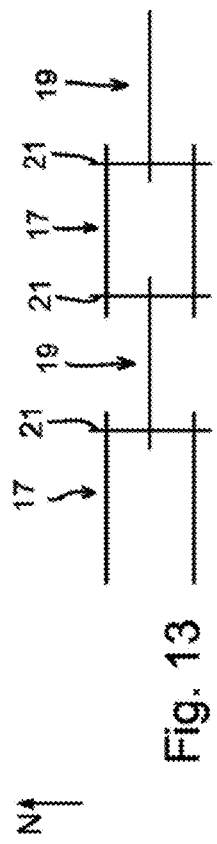

In the embodiment shown in FIG. 17, the first links 17 and the second links 19 again each comprise two longitudinal elements. In this respect, this embodiment, in addition to the fifth embodiment shown in FIGS. 10 to 12, is a further example that the first links 17 or the second links 19 do not necessarily have to be identically formed. However, unlike in the fifth embodiment, in the present case the spacings between the two longitudinal elements do not continuously increase or decrease, but rather change periodically. This is because while the two longitudinal elements in each case have the same spacing from one another in all the second links 19, the arrangement 15 comprises first links 17 whose two longitudinal elements have a larger spacing from one another in comparison thereto and first links 17 whose two longitudinal elements have a smaller spacing from one another in comparison thereto. A further difference from the fifth embodiment is that the spacings between the joint axes G of the articulated joints 21 remain the same such that the links 17, 19 may not be nested within one another.

Figure 18:
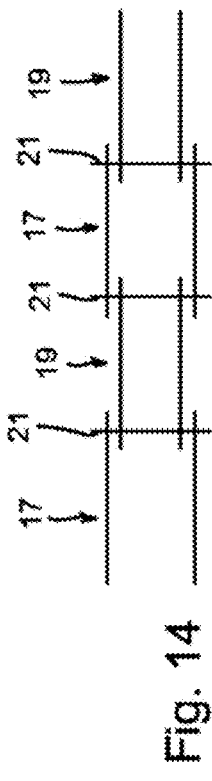
Figure 19:
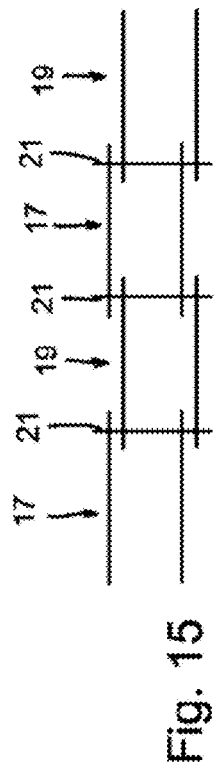
Figure 20:
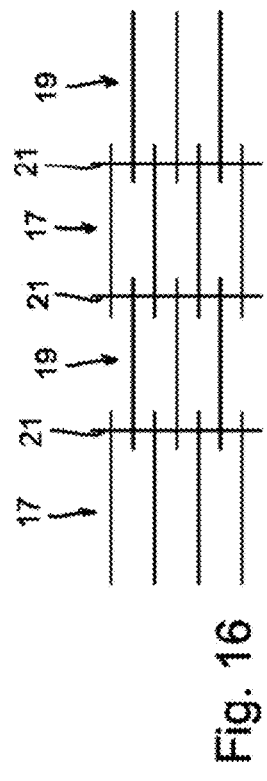

FIGS. 18 to 20 show exemplary embodiments in which the spacing between the respective two longitudinal elements of a respective link 17, 19 is not constant such that in particular the spacing at the first end 33 of the respective link 17, 19 differs from the spacing at the second end 35 of the respective link 17, 19. In the embodiment shown in FIG. 18, the two longitudinal elements are each oriented obliquely to the normal direction N oppositely to one another such that their spacing from one another increases linearly along the longitudinal extent of the respective link 17, 19. In the embodiment shown in FIG. 19, the two longitudinal elements are formed in a stepped manner such that a part section comprising the first end 33 of the respective link 17, 19 is offset from a part section of the respective longitudinal element comprising the second end 35 of the respective link 17, 19 in parallel along the normal direction N or oppositely to the normal direction N. In the embodiment shown in FIG. 20, in each case only one of the two longitudinal elements is formed in a stepped manner in the manner described, while the other has a straight course perpendicular to the normal direction N.

The embodiments shown in FIGS. 18 to 20 have the common feature that the spacing of the two longitudinal elements of a respective link 17, 19 is larger at the second end 35 of the respective link 17, 19 than at the first end of the respective link 17, 19 such that, in the region of the articulated joints 21, the longitudinal elements of a respective link 17, 19 may be arranged between the longitudinal elements of the respective link 17, 19 preceding it. Furthermore, in these embodiments, the first and second links 17, 19 are each substantially of the same kind at least with respect to their basic structure defined by the longitudinal elements and may in particular be of the same structure. However, in the embodiment shown in FIG. 20, the second links 19 are oriented rotated by 180° about an axis parallel to their longitudinal extent relative to the first links 17.

Figure 21:
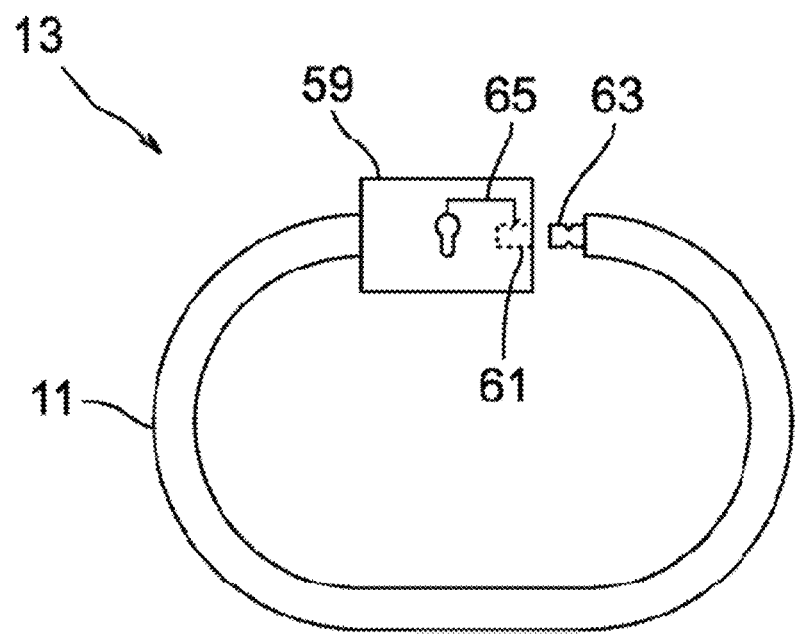
FIGS. 21 and 22 show, in a simplified schematic representation, embodiments of a chain lock in accordance with the present disclosure.
Figure 22:
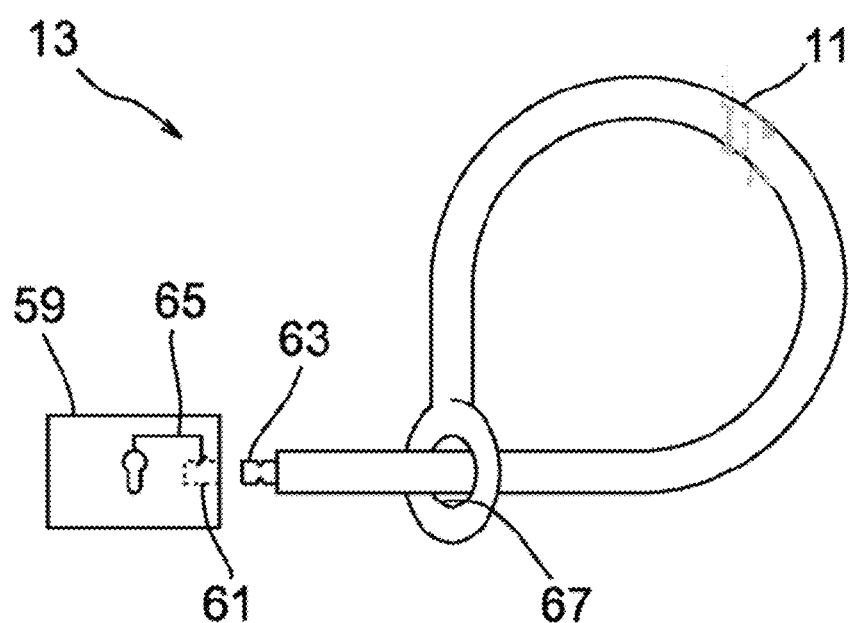

In FIGS. 21 and 22, embodiments of a chain lock 13 in accordance with the present disclosure are schematically shown. In this respect, the chain 11 of the chain lock 13, which may in particular be configured in one of the ways illustrated in FIGS. 1 to 20, is in each case shown simplified as a uniform strand such that the one or more serial arrangements 15, 55 of consecutive links 17, 19, which the chain 11 comprises in each case, as well as the pulling device 45 and any possibly present jacket 51 may not be seen. In the state shown in each of FIGS. 21 and 22, the one or more arrangements 15, 55 are each not in their compact storage configuration, but in a substantially extended configuration, wherein, unlike in the longitudinal configuration extended in a straight manner, they have a course curved to form a loop.

The chain locks 13 of the embodiments shown in FIGS. 21 and 22 each comprise a lock body 59 at which a locking receiver 61 is formed. The chain 11 has a bolt 63 at a respective one of its ends that may be inserted in a latching manner into the locking receiver 61 that functions as a bolt receiver in this respect. Furthermore, at the lock body 59, a respective locking mechanism 65 is provided which may be configured in a manner known per se and by way of which the bolt 63, when it is received in the locking receiver 61, may be secured against a departure from the locking receiver 61.

While the end of the chain 11 opposite the end having the bolt 63 is fixedly connected to the lock body 59 in the embodiment shown in FIG. 21, it has an eyelet 67 in the embodiment shown in FIG. 22, through which eyelet 67 the chain 11 may be inserted with the bolt 63 at the front before the bolt 63 is inserted into the locking receiver 61 and is secured by way of the locking mechanism 65. In this way, the chain 11 may, as shown in FIG. 22, form a loop that may only be reopened when the bolt 63 is released again for a departure from the locking receiver 61 by way of the locking mechanism 65.

However, the chain 11 does not necessarily have to have the bolt 63 at its one end to be lockable to the lock body 59. Rather, the locking receiver 61 may also be configured to receive a section of the chain 11, for instance a respective one of the articulated joints 21 and/or a specific section of a respective link of the chain 11, that may then be secured against a departure from the locking receiver 61 by way of the locking mechanism 65.

During time periods in which the respective chain lock 13 is not used to secure an object, the one or more serial arrangements 15, 55 of consecutive links 17, 19 of the chain 11 of the chain lock 13 may be folded into the compact storage configuration, in particular in a comfortable manner by way of the pulling device 45 of the chain 11. If the chain comprises a plurality of arrangements 15, 55, they may furthermore be arranged adjacent to one another in a compact manner such that the chain 11 may overall be folded in a particularly simple manner for storage or transport.

REFERENCE NUMERALS 11 chain
13 chain lock
15 serial arrangement of first and second links
17 first link
19 second link
21 articulated joint
23 first end of the serial arrangement
25 first end link
27 second end of the serial arrangement
29 second end link
31 link plate
33 first end of the respective link
35 second end of the respective link
37 pin
39 sleeve
41 roller
43 passage opening
45 pulling device
47 pulling element
48 further pulling element
49 fastening element
51 jacket
53 guide element
55 further serial arrangement of first and second links
57 connection link
59 lock body
61 locking receiver
63 bolt
65 locking mechanism
67 eyelet
$d_1$ mean spacing of two link plates of a first link
$d_2$ mean spacing of two link plates of a second link
$d_3$ spacing of the joint axes of two consecutive articulated joints between which a first link extends
$d_4$ spacing of the joint axes of two consecutive articulated joints between which a second link extends
G joint axis
L longitudinal direction
N normal direction
Q transverse direction
$S_1$ first pivot direction
$S_2$ second pivot direction

The invention claimed is:

1. A chain lock comprising a lock body and a chain that comprises a serial arrangement of consecutive links that are coupled to one another via a respective articulated joint between one another and pivotable relative to one another about a joint axis, which is parallel to a normal direction, of the respective articulated joint,
wherein the arrangement is foldable into a compact storage configuration in which, at each of the articulated joints, the links coupled to one another via the respective articulated joint are pivoted relative to one another about the joint axis of the respective articulated joint to such an extent that they enclose the smallest possible angle of their relative pivotability,
wherein all links of the arrangement at least partly adopt the same position along the normal direction,
and wherein the lock body has a locking receiver, which is configured to receive a section of the chain and comprises a locking mechanism by way of which said section of the chain can be secured against a departure from the locking receiver (61).

2. The chain lock in accordance with claim 1, wherein the locking receiver is configured as a bolt receiver and the chain has, at one of at least two ends of the chain, a bolt that forms said section that can be received in the locking receiver and that can be secured against a departure from the locking receiver.

3. The chain lock in accordance with claim 1, wherein the chain comprises a pulling device which extends along said arrangement and by way of which a first end of the arrangement and a second end of the arrangement opposite thereto are pullable toward one another such that the arrangement is brought into the compact storage configuration by the pulling device.

4. A chain for a chain lock, the chain comprising: a serial arrangement of consecutive links that are coupled to one another via a respective articulated joint between one another and that are pivotable relative to one another about a joint axis, which is parallel to a normal direction, of the respective articulated joint,
wherein the arrangement is foldable into a compact storage configuration in which, at each of the articulated joints, the links coupled to one another via the respective articulated joint are pivoted relative to one another about the joint axis of the respective articulated joint to such an extent that they enclose the smallest possible angle of their relative pivotability, and
wherein the chain comprises a pulling device which extends along said arrangement and by way of which a first end of the arrangement and a second end of the arrangement opposite thereto are pullable toward one another such that the arrangement is brought into the compact storage configuration by the pulling device.

5. The chain in accordance with claim 4, wherein the links of the arrangement at least partly adopt the same position along the normal direction.

6. The chain in accordance with claim 4,
wherein said serial arrangement comprises first links and second links that follow one another in an alternating manner along the sequence of the links of the arrangement,
wherein the first links are substantially of the same kind as one another and the second links (19) are substantially of the same kind as one another, and wherein the first links (17) differ from the second links (19).

7. The chain in accordance with claim 4,
wherein the links of the arrangement in the compact storage configuration, which are coupled to a respective preceding link via a respective articulated joint, are pivoted in an alternating manner in a first pivot direction and in a second pivot direction opposite to the first pivot direction relative to the respective preceding link about the joint axis of the respective articulated joint.

8. The chain in accordance with claim 4, wherein the pulling device comprises an elongate pulling element that extends along the arrangement.

9. The chain in accordance with claim 8, wherein the pulling element has a slalom-like course about the joint axes of the articulated joints and/or wherein a winding mechanism is provided at the pulling element by way of which the pulling element can be wound up.

10. The chain in accordance with claim 8, wherein the pulling element is elastic and/or wherein each of the links of the arrangement has a respective passage opening and the pulling element extends through the passage opening of each link.

11. The chain in accordance with claim 4,
wherein each of the links of the arrangement comprises two respective link plates that are arranged offset from one another along the normal direction, wherein each of the two link plates extends from a first end of the respective link, at which the articulated joint is configured for coupling to the link preceding the respective link, to a second end of the respective link which is opposite to said first end and at which the articulated joint is configured for coupling to the link following the respective link.

12. The chain in accordance with claim 11, wherein each of the links of the arrangement has a respective passage opening and the pulling element extends through the passage opening of each link; and
wherein said passage opening is formed between the two link plates of the respective link and between the first end and the second end of the respective link.

13. The chain in accordance with claim 11,
wherein the links of the arrangement alternately have a larger spacing and a smaller spacing between their two respective link plates; and/or
wherein the spacing between the two link plates is larger at the first end of the respective link than at the second end of the respective link.

14. The chain in accordance with claim 10, wherein both the spacing between the two link plates of a respective link and the spacing between the first end and the second end of the respective link either continuously decreases or continuously increases along the sequence of the links of the arrangement.

15. The chain in accordance with claim 4,
wherein the articulated joints each comprise a pin, which is formed at the one link coupled by the respective articulated joint, and a sleeve which is formed at the other link coupled by the respective articulated joint and which is engaged through by the pin such that said sleeve is pivotable about the pin.

16. The chain in accordance with claim 4,
wherein the chain comprises a hose-like jacket that envelops the arrangement from the first end of the arrangement up to the second end of the arrangement both in the compact storage configuration and in an extended longitudinal configuration of the arrangement in which the first end of the arrangement and the second end of the arrangement are spaced apart from one another at a maximum.

17. The chain in accordance with claim 4,
wherein the chain comprises a fixing device for fixing the arrangement in the compact storage configuration.

18. The chain in accordance with claim 4
wherein the chain comprises a further serial arrangement of consecutive links that is foldable into a compact storage configuration in which, at each articulated joint that couples a respective link of the further arrangement to a link of the further arrangement preceding the respective link it, the respective link is pivoted relative to the link preceding the respective link it about the respective joint axis to such an extent that the respective link and the link preceding the respective link it enclose the smallest possible angle of their relative pivotability,
wherein a first end and a second end of the further arrangement are pullable toward one another by way of the pulling device such that the further arrangement is brought into the compact storage configuration by the pulling device, and
wherein the two arrangements are coupled to one another in an articulated manner such that, when they are each folded into their compact storage configuration, they can be arranged offset parallel to one another.

19. The chain in accordance with claim 4,
wherein the chain is installed in a chain lock that comprises a lock body, wherein the lock body comprises a locking receiver and a locking mechanism, wherein in a locked state of the chain lock the locking receiver receives a section of the chain and the locking mechanism secures the section of the chain against removal from the locking receiver.

20. A chain lock comprising a lock body and a chain that comprises a serial arrangement of consecutive links that are coupled to one another via a respective articulated joint between one another and are pivotable relative to one another about a joint axis of the respective articulated joint, the joint axes of the articulated joints extending parallel to one another;
wherein the arrangement is foldable into a compact storage configuration in which, at each of the articulated joints, the two links coupled to one another via the respective articulated joint are pivoted relative to one another about the joint axis of the respective articulated joint such that they enclose the smallest possible angle of their relative pivotability;
wherein at each of the articulated joints the two links coupled to one another via the respective articulated joint at least partly lie within a common plane that extends perpendicular to the joint axis of the respective articulated joint; and
wherein the lock body comprises a locking receiver and a locking mechanism, wherein in a locked state of the chain lock the locking receiver receives a section of the chain and the locking mechanism secures the section of the chain against removal from the locking receiver.

* * * * *